(12) United States Patent
Steinberg et al.

(10) Patent No.: US 11,438,334 B2
(45) Date of Patent: *Sep. 6, 2022

(54) SYSTEMS AND METHODS FOR SECURING SOCIAL MEDIA FOR USERS AND BUSINESSES AND REWARDING FOR ENHANCING SECURITY

(71) Applicant: SecureMySocial, Inc., Teaneck, NJ (US)

(72) Inventors: Joseph Steinberg, Teaneck, NJ (US); Shira Rubinoff, Teaneck, NJ (US)

(73) Assignee: SecureMySocial, Inc., Teaneck, NJ (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/935,766

(22) Filed: Jul. 22, 2020

(65) Prior Publication Data

US 2020/0351269 A1 Nov. 5, 2020

Related U.S. Application Data

(63) Continuation of application No. 16/100,978, filed on Aug. 10, 2018, now Pat. No. 10,771,464, which is a
(Continued)

(51) Int. Cl.
*H04L 29/06* (2006.01)
*H04L 9/40* (2022.01)
(Continued)

(52) U.S. Cl.
CPC ............. *H04L 63/10* (2013.01); *G06Q 50/01* (2013.01); *H04L 51/12* (2013.01); *H04L 51/32* (2013.01);
(Continued)

(58) Field of Classification Search
CPC ......... H04L 63/10; H04L 63/20; H04L 51/32; H04L 51/12; H04L 63/0227; H04L 63/0245; G06Q 50/01
See application file for complete search history.

(56) References Cited

U.S. PATENT DOCUMENTS 8,205,245 B2 6/2012 Tam et al.
8,219,631 B2 7/2012 Kim
(Continued)

OTHER PUBLICATIONS

Becchi et al., Extending finite automata to efficiently match Perl-compatible regular expressions, CoNEXT '08: Proceedings of the 2008 ACM CoNEXT Conference, Dec. 2008.*
(Continued)

*Primary Examiner* — Morshed Mehedi
(74) *Attorney, Agent, or Firm* — Han Santos, PLLC

(57) ABSTRACT

The disclosed system and method enhances security of people, organizations, and other entities that use what has been termed "social media." Recent trends have shown that information posted to social media may cause tremendous damage to individuals and other entities. This includes information that was posted deliberately or unintentionally, including social security numbers, financial data and other sensitive information. Further, information that previously may have been viewed as innocuous, such as location data, has caused harm on certain occasions and may need to be protected. The disclosed system provides a novel method of screening, identifying, and preventing certain information from being posted on social media and other public locations. In addition, the disclosed system and method improves security by motivating people to use security software by offering rewards for its use.

20 Claims, 19 Drawing Sheets

Related U.S. Application Data continuation of application No. 15/687,651, filed on Aug. 28, 2017, now Pat. No. 10,084,787, which is a continuation of application No. 14/846,794, filed on Sep. 6, 2015, now Pat. No. 9,813,419, which is a continuation of application No. 13/921,205, filed on Jun. 18, 2013, now Pat. No. 9,374,374.

(60) Provisional application No. 61/855,133, filed on May 9, 2013, provisional application No. 61/690,090, filed on Jun. 19, 2012.

(51) Int. Cl.
*H04L 51/00* (2022.01)
*H04L 51/52* (2022.01)
*G06Q 50/00* (2012.01)

(52) U.S. Cl.
CPC ...... *H04L 63/0227* (2013.01); *H04L 63/0245* (2013.01); *H04L 63/20* (2013.01)

(56) References Cited

U.S. PATENT DOCUMENTS

| | | |
|---|---|---|
| 8,276,207 B2 | 9/2012 | Walsh et al. |
| 8,306,922 B1 | 11/2012 | Kunal et al. |
| 8,312,276 B2 | 11/2012 | Chiou et al. |
| 8,320,617 B2 | 11/2012 | Krahnstoever et al. |
| 8,495,709 B1 | 7/2013 | Cooper et al. |
| 8,504,481 B2 | 8/2013 | Motahari et al. |
| 8,538,895 B2 | 9/2013 | Appelman et al. |
| 8,601,596 B2 | 12/2013 | Wu et al. |
| 8,630,968 B2 | 1/2014 | Sinha |
| 8,631,473 B2 | 1/2014 | Bhatia et al. |
| 8,635,674 B2 | 1/2014 | Bhatia et al. |
| 9,055,097 B1 | 6/2015 | Foster et al. |
| 9,237,386 B2 | 1/2016 | Oztaskent et al. |
| 9,374,374 B2 | 6/2016 | Steinberg et al. |
| 9,449,109 B1* | 9/2016 | Keel .................. G06F 16/9537 |
| 9,813,419 B2 | 11/2017 | Steinberg et al. |
| 2008/0109244 A1 | 5/2008 | Gupta |
| 2012/0311034 A1 | 12/2012 | Goldband et al. |
| 2012/0323627 A1* | 12/2012 | Herring, Jr. ............ G06Q 30/02 705/7.29 |
| 2013/0018823 A1* | 1/2013 | Masood .............. H04L 63/1441 706/12 |
| 2013/0091274 A1 | 4/2013 | Fanto et al. |
| 2013/0124644 A1 | 5/2013 | Hunt et al. |
| 2013/0262188 A1 | 10/2013 | Leibner et al. |
| 2013/0290317 A1* | 10/2013 | Spivack ............ G06F 16/24522 707/723 |
| 2013/0325850 A1 | 12/2013 | Redmond et al. |
| 2013/0339062 A1 | 12/2013 | Brewer et al. |
| 2013/0340089 A1* | 12/2013 | Steinberg ................ H04L 51/12 726/27 |
| 2014/0324719 A1 | 10/2014 | Canal |
| 2015/0127748 A1 | 5/2015 | Buryak |
| 2017/0374072 A1 | 12/2017 | Steinberg et al. |

OTHER PUBLICATIONS

Bian et al., "Finding the right facts in the crowd: factoid question answering over social media", Publication: WWW '08: Proceedings of the 17th international conference on World Wide Web, Apr. 2008.
Brand.com website homepage (retrieved on Apr. 30, 2014) (available at www.brand.com).
Control Negative Content with Reputation Defender, Reputation.com (retrieved on Apr. 30, 2014) (available at www.reputation.com/reputationdefender).
Free Tool Scans For Viruses On Facebook, FoxNews, Jul. 12, 2012 {available at www.foxnews.com/tech/2012/07/12/free-tool-scans-for-viruses-on-facebook/).
Hearsaysocial.com, Product Overview webpage (retrieved on Apr. 30, 2014) (available at www.hearsaysocial.com/product/overview/).
rhe Facebook-McAfee Lockout, TechyDad, Feb. 18, 2013 (available at wwwJechydad_com/2013/02/thefacebook-mcafee-lockout/).
Malware Checkpoint for Facebook, Jul. 10, 2012 {available at www.facebook.com/notes/facebook-security/malware-checkpoint-for-facebook/10150902333195766).
NetNanny.com website homepage (retrieved on Apr. 30, 2014) (available at www.netnanny.com).
Norton Internet Security Software Screenshot (2014).
Notice of Allowance and Examiner's Amendment dated Jun. 13, 2018 in U.S. Appl. No. 15/687,651.
Notice of Allowance dated Apr. 7, 2016 in U.S. Appl. No. 13/921,205.
Notice of Allowance dated May 16, 2018 in U.S. Appl. No. 15/687,651.
Notice of Allowance dated Oct. 2, 2017 in U.S. Appl. No. 14/846,794.
Office Action dated Aug. 11, 2015 in parent U.S. Appl. No. 13/921,205.
Office Action dated Dec. 14, 2017 in U.S. Appl. No. 15/687,651.
Office Action dated Mar. 6, 2017 in U.S. Appl. No. 14/846,794.
Office Action dated Nov. 18, 2015 in parent U.S. Appl. No. 13/921,205.
Symantec Data Loss Prevention: Discover, monitor and protect your confidential data, Symantec Corporation (retrieved on Apr. 26, 2014) (available at www.symantec.com/data-loss-prevention).
Symantec to Acquire Vontu, Press Release, Symantec Corporation, Nov. 5, 2007 (available at www.symantec.com/about/news/release/article.jsp?prid=20071105_01).
U.S. Appl. No. 16/100,978, Notice of Allowance dated Apr. 22, 2020, 33 pages.
Wilson et al., "User interactions in social networks and their implications", EuroSys 09 Proceedings of the 4th ACM European conference on Computer systems, Nuremberg, Germany—Apr. 1-3 (Year: 2009).

* cited by examiner

SOCIAL MEDIA CONVERSATION
User B: "What happened to User D?"
User C: "He got arrested."
User A: "LOL!"

User A

SOCIAL MEDIA SHARING
User B: [upload photo]
"User A #drunkbasketball"

User A    User B

SOCIAL MEDIA CONVERSATION
Username: "No more drug laws."
User A: "@username truth."

User A

WARNING!!!

You just posted:

> My daughter started elementary school at Hawthorne School today!

- Your privacy settings currently allow anyone to see your posts.
- Your current post will tell anyone in the world where your daughter goes to school.

What would you like to do:

- POST ANYWAY
- EDIT POST
- CHANGE PRIVACY SETTINGS
- CANCEL POST

XYZ Corp.
Rules For Group: MARKETING DEPARTMENT

- ☑ Platform Name A
  -  Rule Name and Description
  -  Rule Name and Description
- ☑ Platform Name B
  -  Rule Name and Description
  -  Rule Name and Description

SYSTEMS AND METHODS FOR SECURING SOCIAL MEDIA FOR USERS AND BUSINESSES AND REWARDING FOR ENHANCING SECURITY

CROSS-REFERENCE TO RELATED APPLICATIONS

This application is a continuation of U.S. patent application Ser. No. 16/100,978, filed on Aug. 10, 2018, which is a continuation of U.S. patent application Ser. No. 15/687,651, filed on Aug. 28, 2017, now U.S. Pat. No. 10,084,787, which is a continuation of U.S. patent application Ser. No. 14/846,794, filed on Sep. 6, 2015, now U.S. Pat. No. 9,813,419, which is a continuation of U.S. patent application Ser. No. 13/921,205, filed on Jun. 18, 2013, now U.S. Pat. No. 9,374,374, which claims priority to provisional application No. 61/690,090 filed on Jun. 19, 2012, and provisional application No. 61/855,133, filed on May 9, 2013. The contents of U.S. patent application Ser. Nos. 16/100,978, 15/687,651, 14/846,794, 13/921,205, 61/690,090, and 61/855,133 are incorporated in their entirety by reference herein.

FIELD OF INVENTION

This invention relates to user, organization, and information security on computer networks and social media services.

BACKGROUND

Traditionally, security risks to computer users—especially those connected to the Internet—were caused by technical vulnerabilities, and, therefore, Internet security packages have historically focused on securing against threats that exploit technical vulnerabilities to compromise electronic resources and/or render technology difficult to use. Internet security packages for consumers and other individual users typically include anti-virus, anti-malware, anti-spam, anti-phishing/anti-malicious-websites, firewall, basic intrusion prevention and detection, and other technical-type defenses. Server security systems typically include technology that is more robust and, in addition to providing more powerful versions of the types of defenses that existed for end users as described above, address the additional risks to the organizations providing services via the servers—typically functions like authentication, authorization, and other server-specific risks.

Various network security systems and other types of technical defenses were also developed, marketed, and deployed. But, in each of these cases, the digital security was primarily intended to address technical vulnerabilities, and when human error was being addressed by such technologies it was in the context of human error creating those technical vulnerabilities (for example, if a human turned off anti-virus software, an Internet security software package might, upon checking the machine, warn the user that that a technical vulnerability existed in that anti-virus software was turned off). Even enterprise-level management packages work by addressing technical risks in such a fashion. In the previous example, an enterprise-level utility might prevent a user from accidentally turning off anti-virus software or opening up personal firewall ports, or might correct the situation if a user did so. Software offered as a service (SaaS) models of implementations, and the proliferation of mobile devices, did not dramatically alter the offered security solutions either; since technical defenses were used to secure against technical risks, with packages being essentially (significantly scaled down versions of) anti-virus, anti-phishing/anti-malicious-websites, and personal firewalls with some additional mobile-specific functions such as remote wipe capabilities. Even with the mass adoption of social media and its usage, security packages that offered "social media security" did so by scanning social media for links to rogue websites, malware, and the like. The basic concept of digital security—securing against technical risks—did not change, and until the present invention, remains unchanged.

While ensuring security against technical risks remains important, a new series of security risks has emerged, and, prior to the present invention, a major risk—in fact what may be the greatest risk—to users of social media has not been addressed. Whereas malware and other technical risks may once have been the biggest problem for users, today the risks associated with the divulging of information that a user does not intend to divulge, or that the user intends to divulge but does not understand the consequences of divulging, or that the user thinks is being divulged to particular party or parties but in fact is being divulged to others as well (or instead), may be more significant, especially since no real countermeasures have been developed until the current invention.

While some people are aware that one should not explicitly post sensitive information in social media that is publicly viewable—such as posting one's email password on a FACEBOOK™ wall or timeline—it is quite common for users not to realize the consequences of their postings in social media, or the postings of others that may have relevance to them. Information that can be extrapolated from what the user may think are innocuous postings, settings, or other aspects of social media can be seriously damaging to the user. As one example, some people continue to use their mothers' maiden name as a password for accessing their financial and medical data—yet this information can often easily be gleamed by anyone viewing their FACEBOOK™ profile. Likewise, people may post information that impacts their employers, organizations for which they volunteer, and other entities. A user who, using a social media site, suddenly connects with multiple people in the mergers and acquisition practice of a law firm that services his employer, for example, may cause others to realize that his employer is considering a sale.

The great risk of unintended consequences of both intentionally and unintentionally sharing information through the use of social media platforms by users and others has emerged and poses a serious threat in the present day—yet no current security product addresses it. Users of social media often post items (including information, text, cartoons, videos, photos, sound bites, and other forms of media)—or have information posted about them, or associated with them by others, by apps, or by computers themselves (often without the knowledge of the user)—that may expose them—or increase their exposure to—one or more negative consequences. Businesses may be put at competitive risk, or even get into trouble for violating regulations, as a result of social media posts. It is important to realize that a problematic item or content which can cause negative consequences is not necessarily a negative or derogatory sounding posting. If an employee of a company posts a comment online that is highly complimentary of products of that firm's direct competitor, that post, while sounding positive, may he highly negative in effect for the poster and his or her employer.

Examples of information sharing that can lead to harmful consequences include:

sharing information about a person's family relationships, place of employment, and interests can be leveraged by criminals as part of identity theft;

sharing information about a person's children and their schedules may help facilitate kidnapping, break-ins into the person's home while he is carpooling to work, or other harmful actions;

publishing evidence that a user has engaged in potentially controversial activities, such as photographs of alcohol and drug consumption, smoking, using weapons, participating in various activities, viewing materials in which people appear in various states of undress, crass humor, dressing in various type of garments, viewing or posting racist-type materials, associating with certain characters, and other examples of potentially problematic or controversial activities—could impact a person's business, employment, or social prospects;

sharing various types of information that may impact a user's relationships, such as a photo of a man holding another woman, and vice versa, could impact his or her relationship with a girlfriend or spouse;

sharing information related to financial or medical activities may lead to disclosure of very sensitive and private information. For example, photographs or location data placing a person at a particular medical facility may divulge that the person suffers from a condition which that facility is known to specialize in treating;

included in social media would be gaming sites in which posting dialogue, stats, interests, etc. can lead to problems, by, for example, allowing an employer to discern that an employee was playing during work, allowing teachers to determine that a student was playing during school hours when she was supposed to be home sick, publicizing all sorts of private and personal information. Moreover, criminals know to look at these sites for information about people;

sharing or leaking confidential information about a business's customers, competitors, research, contemplated products, potential litigation or exposure to liabilities, etc. can lead to problems for that business. Various types of such leaks may even violate the law, such as, for example, securities laws relating to public disclosure;

publication of information regarding a person's connections in social and professional media may signal implications for the person's employer. For example, an employee who works in the legal department connecting with multiple people from a competing organization, or with parties involved with Mergers and Acquisition services, may signal potential M&A activity of his employer;

sharing photographs or making posts relating to a domestic or international geopolitical issue may result in increased government surveillance, or incorrectly being associated by government agencies with various dangerous groups; and sharing photographs and videos of an employee pictured with, or commenting about, a competitor's offering can lead to potential lawsuits (for example, if the employee speaks negatively about the offering with inaccurate information), or in a competitor obtaining an advantage (if the employee endorses the competitor's product on camera).

Naturally, many other examples are possible, but the aforementioned illustrate why there is concern about the unintended consequences of sharing of information through social media. Additional examples will be presented in the following discussion and descriptions.

Furthermore, because social media is relatively new, people are not as knowledgeable of the risks related to its usage as they are to most other computer security issues. At least in much of the Western world, a generation of people is presently being raised whose parents are familiar with the concept of computer viruses and the need for anti-virus software. The new generation will be, for example, instructed by their parents about the risks of viruses and the need to use anti-virus software, much like earlier generations were taught about the dangers of fire and flammable materials. However, no child growing up today has parents who used social media for more than a few years (since social media is only a few years old). Moreover, none of today's parents were educated when they were young about the risks of social media—creating a situation in which a huge percentage of the population does not understand the full risks of social media usage, and as a consequence, younger people cannot be properly trained about its risks. Likewise, employers have proven unprepared for dealing with social media—which poses risks with which they have never had to previously deal.

As those skilled in the art will recognize, the non-technological risks of social media are significant. These risks are exacerbated by a general lack of awareness by the public of the risks, the lack of preventive action by the public that can avoid social media problems, and non-existence of technologies that can address the risks in any automated fashion prior to the invention.

Furthermore, as those skilled in the art will recognize, most people do not like to make efforts in order to ensure cyber security. People often do not recognize, or dismiss, the magnitude of risk to themselves if they avoid taking action, and consequently they don't take any potentially preventive action. Therefore, anything that can successfully motivate users to improve security, or to utilize security-improving technology, has significant benefits. Today, social media users are accustomed to responding to posts from businesses that give away freebies or offer discounts for performing various simple, non-invasive actions. In addition, social media has become a major sociological force and people often enjoy participating therein. As such, a system or mechanism that, in addition to improving security, would offer some tangible incentive for users to improve security, that mechanism could gain wide acceptance and make a big difference. This is especially true if the system, which leverages social media to reward users, is intended for use by people who are already known to use social media. Furthermore, people typically like to be recognized at work, so a reward system implemented by an employer for employees who utilize a security system can be highly effective.

In addition to all of the above, parents and other guardians may wish to secure their children or others from various risks of public information sharing, some of which are described herein. Likewise, businesses and other organizations want to protect themselves as well as people associated with them (employees, board members, contractors, partners, etc.) from the risks described above, and also from running afoul of regulatory or legal requirements. One problem faced by businesses, parents, and other guardians in implementing a security solution is their appearance as a "Big Brother," which frequently comes with active monitoring. Another problem is that certain types of monitoring by businesses and individuals may be illegal.

Even if the monitoring is legal, it is both an arduous task, and something which, in a best case scenario, will still cause a lot of ill will, employee dissatisfaction, and negative publicity. To address social media risks, some businesses have prohibited the use of social media by their employees at work, but stopping people from using it during off hours is nearly impossible, and the risks remain if such access is allowed. Furthermore, social media is becoming increasingly necessary for business—so prohibitions on use are becoming impractical and an impediment to success. Likewise, scenarios in which employees bring their own mobile devices to work render it nearly impossible to prohibit social media access while at work.

It is therefore the object of the present invention to provide a system and method for solving the problems outlined above.

SUMMARY

The present invention provides systems and methods for securing individuals, organizations, and other entities from unintentional disclosure of potentially harmful information to social media or other public channels. In one embodiment, the system scans 'sharing' and uploading requests by users for potentially harmful information, and takes appropriate action based on certain rule sets. The system may perform scans either in real time, as a user uses social media; after a user enters information into social media; as he or she types on social media before he or she even submits the information to the social media; as it is entered by the user but before it actually appears to others; in batch mode; or through other means. The system may also periodically scan a user's social media contents.

In one embodiment, the system warns users that their 'sharing' request contains potentially harmful information. In another embodiment, the system automatically or with user input removes, adds, or modifies uploaded data, multimedia, or other items. The system may also delay sharing or quarantine 'shared' data based on certain rules and analysis. In another embodiment, the invention may also scan other Internet venues for potentially harmful data.

In one embodiment, the system rewards users for using the implemented or other security system to secure themselves and others. In another embodiment, the system facilitates profiting by a party offering the security system to users by enabling third-parties to market their offerings for free, at a discount, or through some other arrangement to users of the security system, or in exchange for points earned for using the system.

Another aspect of the invention is to ensure that a user's social media presence, or another party's social media presence that links, references, or names the user, is presenting only the information that the user intends to present, and/or only to the parties the user intends to present it. In another aspect, the system presents the user with the potential consequences of sharing information before allowing the user to make the information public.

Various embodiments of the invention address risks including, but not limited to:

competitive risks, such as leaking info about planned products, contemplated M & A activity, marketing strategy, R & D, or vulnerabilities to competition;

intellectual property risks, such as leaking information that compromises intellectual property;

regulatory and legal risks, such as leaking quarterly numbers before officially announced, providing insider information, and leaking employee, medical, or financial information;

physical risks, such as providing information which assists criminals to kidnap, rape, or burglarize;

reputational risks, such as disclosing "sins," or drug and alcohol use;

personal risks, such as affairs, questionable interests, disclosing medical conditions, or outing undisclosed sexual practices; and/or professional risks, such as unprofessional behavior, looking for new job, looking to move far from job, or seeking to become pregnant.

Various embodiments of the present invention may be implemented in a number of ways, including, for example, as:

an app or other program on a mobile device running as a separate application;

an app or other program that runs within the confines of a social media platform (e.g., a FACEBOOK™ app);

an app or other program that runs on a computer;

an SaaS app or other program that runs on a separate server;

an app or other program on a computer or mobile device that serves only as an interface with which to interact with the user, but all logic and scanning done from a server;

an app or other program that leverages APIs of social media platform(s); and/or a combination of the aforementioned technologies or other embodiments mentioned elsewhere in the specification and drawings.

As those skilled in the art recognize, once an item is shared via social media it is very difficult, or may be impossible, to erase the item and guarantee that the item will stay erased, since someone could have taken a screenshot of it before erasure or otherwise recorded it. Hence, the proactive prevention of posting potentially harmful information that the user may later regret posting is important, and is addressed in this invention. Furthermore, the ability to remove offending items from social media as quickly as possible is also important, and this feature is also facilitated by the present invention.

DETAILED DESCRIPTION

For the purpose of convenience, the specification and drawings may refer to various aspects of the invention as a Data Security System ("DSS") or a Data Security Module ("DSM"). These monikers are not intended to unnecessarily narrow or constrain the invention, but rather are used for brevity. Depending on the embodiment of the invention, described in detail below, the DSS may comprise one or more DSMs.

Figure 1:
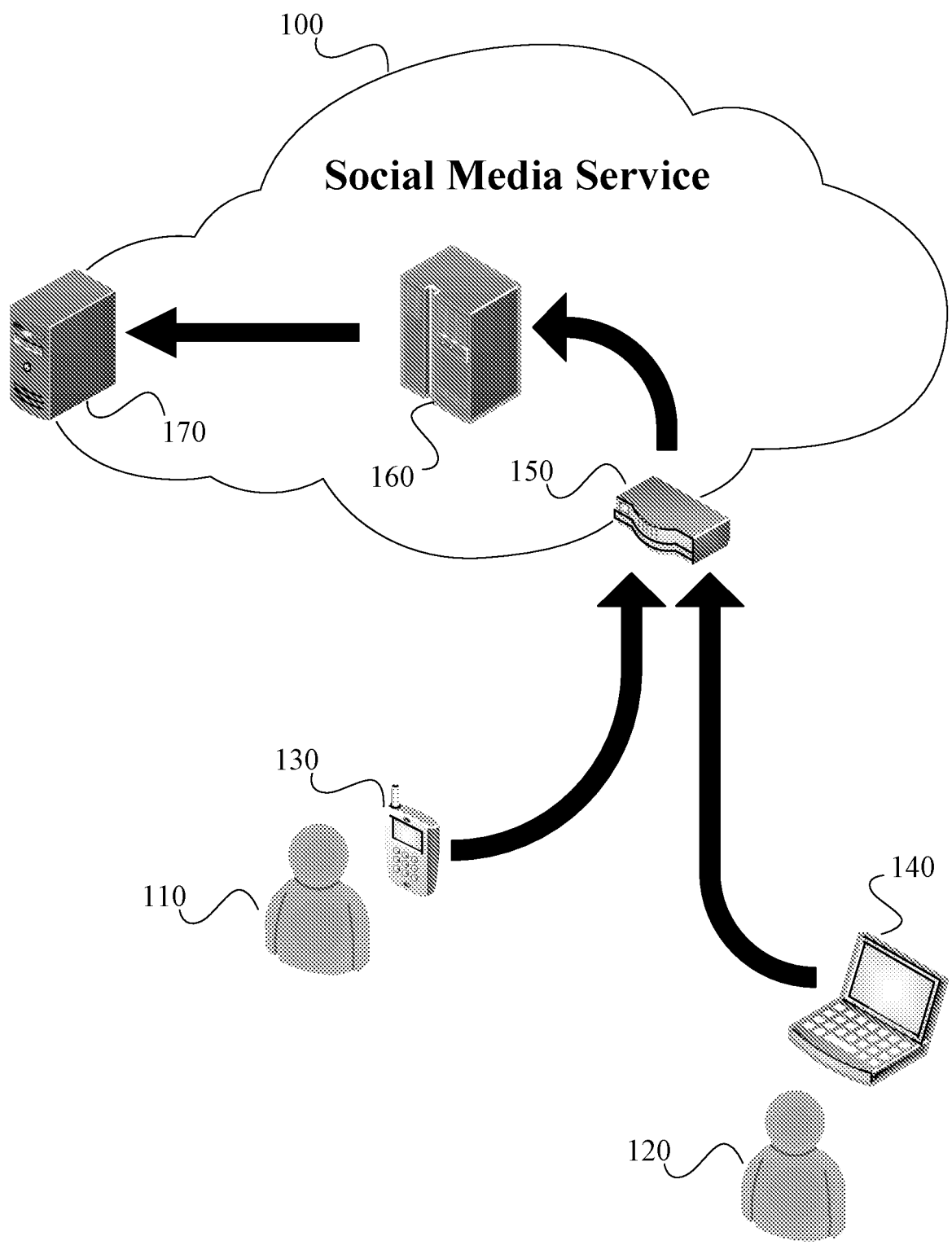
FIG. 1 illustrates one possible embodiment of a cloud based social media service.

FIG. 1 illustrates some of the components that are typical in a modern, cloud-based, computer network. Social Media Service 100 is based in the cloud, and comprises equipment such as edge device 150 (which can be a router or server with load-balancing features), an application server 160 (which performs the heavy data processing required by large scale systems), and web server 170 (which provides the public with access to data hosted on the social media site). One of ordinary skill in the art will recognize that the word "server" is not limited to a single server box or computer, and can refer to a distributed system with numerous computer components and instances. User 110 accesses the social media site via smart phone 130, and user 120 accesses the site via laptop 140. Generally, when users want to share data on the social media site, they upload text, photographs, multimedia, or other data through edge device 150, which forwards the data to an appropriate application server 160, which, after processing the data, makes it available to the public, or a certain subset of the public, via web server 170.

Figure 2:
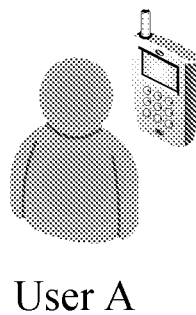
FIG. 2 illustrates a social media conversation between three users.

FIGS. 2-8 illustrate some of the problematic situations addressed by the present invention. In FIG. 2, User A (such as user 110 from FIG. 1) is involved in a public conversation, available for viewing by others, such as the case with most FACEBOOK™ wall and timeline postings. User B begins the conversation by asking "What happened to Dave?" User C responds by saying "He got arrested." User A, not having all information required to make a wise decision, and perhaps without comprehending the consequences of his musings, quips "LOL!" on the same conversation strand. Unfortunately for User A, User D was arrested for sexual assault, a charge not many people would find amusing. User A's comment is now public, and even if User A subsequently deletes the comment, it has likely been seen by dozens, if not hundreds, of other people.

Figure 3:
FIG. 3 illustrates social media sharing by a user.
Figure 3:
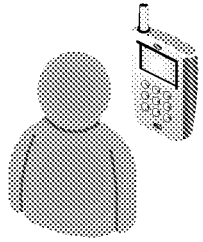

In FIG. 3, User B uploads a photograph of User A, and captions it with "User A #drunkbasketball." Unbeknownst to User B, User A is on probation and not permitted to consume alcohol. Even if the hashtagged phrase is incorrect, User A now has some explaining to do to his or her probation officer.

Figure 4:
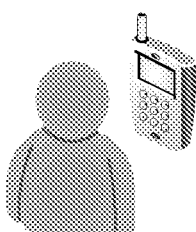
FIG. 4 illustrates a social media conversation between two or more users.

In FIG. 4, User A participates in a TWITTER™ type conversation. Username, who for the purpose of this hypothetical happens to be a convicted drug dealer, tweets "No more drug laws." Somehow seeing the tweet, User A responds with "@Username truth." Unintentionally, User A started participating in a public conversation with a convicted felon.

Figure 5:
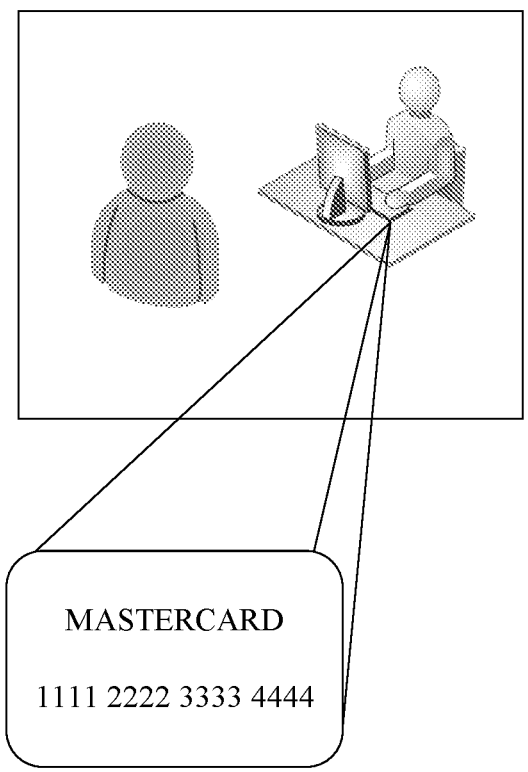
FIG. 5 illustrates an example of a digital photograph with a credit card.
Figure 6:
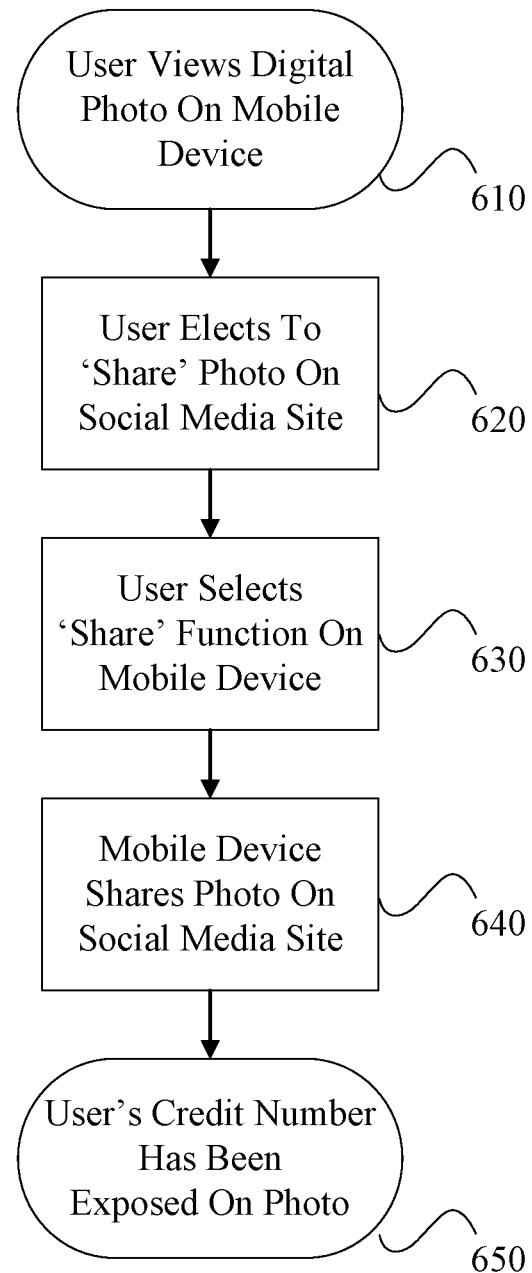
FIG. 6 illustrates a process of unintentionally publishing a credit card number.

FIGS. 5-8 illustrate other scenarios where confidential information is unintentionally made public. FIG. 5 illustrates a digital photograph of two people, one of whom is sitting behind an office desk. The photograph also includes a credit card, which was lying face up on the desk. In FIG. 6, at step 610, the user of a mobile device views the photograph from FIG. 5 on the mobile device's display. Unable to see great detail on the small screen, the user elects to share the photo on a social media site in step 620. In step 630, the user selects a 'Share' function in a social media application or gallery app on the device. In step 640, the mobile device uploads the photo to the social media site. In step 650, the social media concludes the unintentional leak by making the photo available to the public. The high resolution with which the photograph was taken provides plenty of detail from which the credit card number and expiration date can be discerned from a computer.

Figure 7:
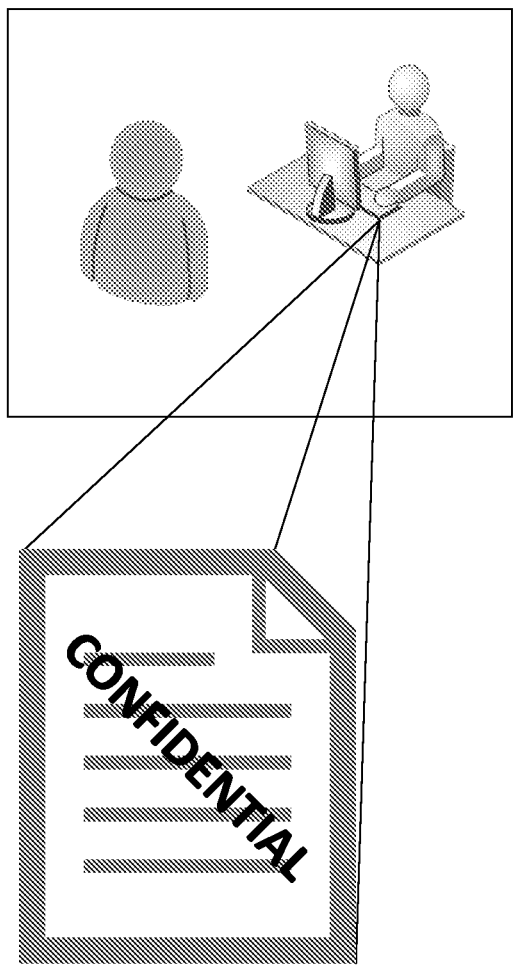
FIG. 7 illustrates an example of a digital photograph with a confidential document.
Figure 8:
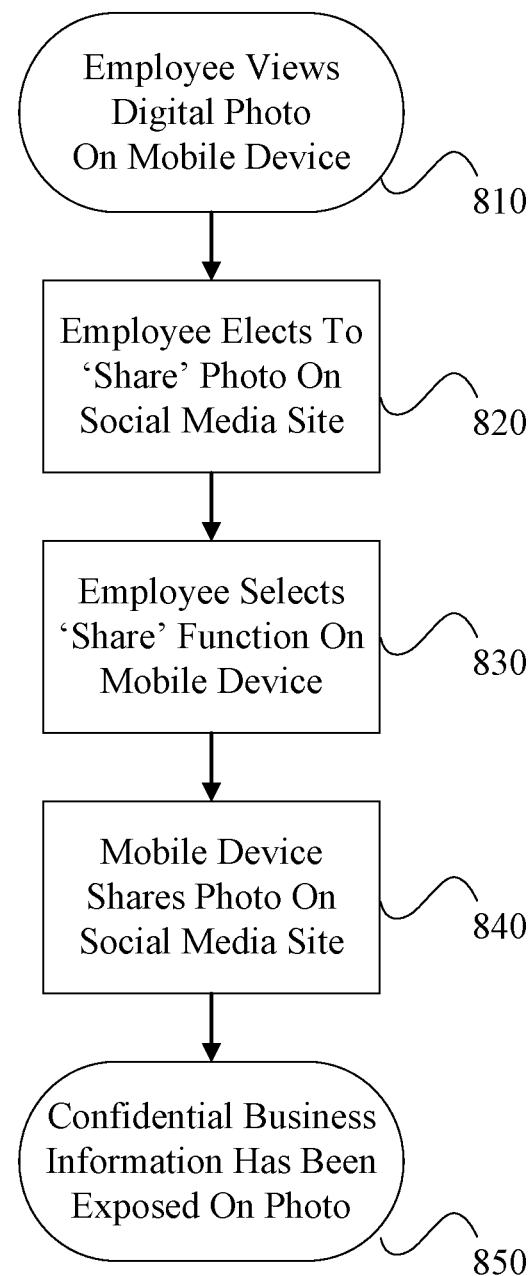
FIG. 8 illustrates a process of unintentionally publishing a confidential document.

FIGS. 7-8 illustrates a scenario in which a highly confidential business document is unintentionally leaked to the Internet. FIG. 7 illustrates a digital photograph of two people, one of whom is sitting behind an office desk. The photograph also includes a highly confidential business document that is lying face up on the desk. In FIG. 8, at step 810, a business employee views the photograph from FIG. 7 on a mobile device's display. Unable to discern any details on the small screen, the employee elects to share the photo on a social media site in step 820. In step 830, the employee selects a 'Share' function in a social media application or gallery app on the device. In step 840, the mobile device uploads the photo to the social media site. In step 850, the social media concludes the unintentional leak of highly confidential business information by making the photo available to the public. The high resolution with which the photograph was taken provides plenty of detail from which the confidential document can be viewed on a computer.

Figure 23:
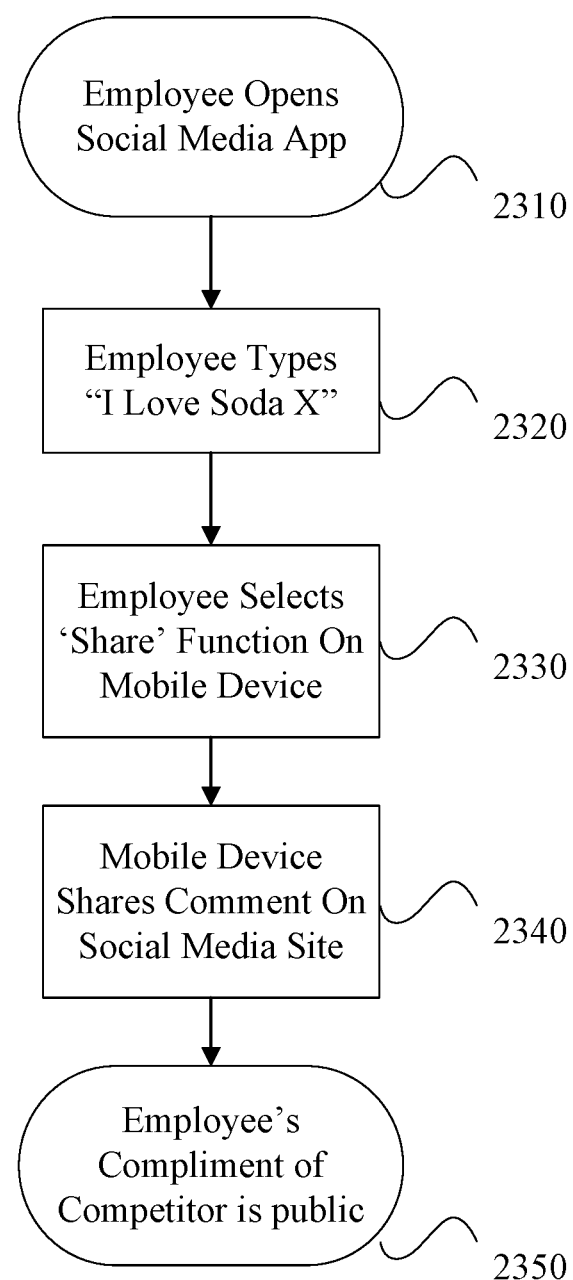
FIG. 23 illustrates an example of an employee action that has unintended consequences for the employer.

FIG. 23 illustrates a scenario in which an employee unintentionally hands his employer's competitor an advantage. In FIG. 23, at step 2310, employee of company Y opens a social media app on his device. At step 2320, the employee types "I love Soda X!" and selects the 'Share' function in the social media application at step 2330. At step 2340, the mobile device uploads the comment to the social media site. In step 2350, the social media concludes the unfortunate process by disclosing the fact that employee of company Y loves soda made by company X, company Y's competitor.

The present invention can eliminate the information leaks and mishaps illustrated in FIGS. 2-8.

Architecture

In the preferred embodiment, the present invention is implemented in software. One of ordinary skill in the art, however, will understand that the present invention may also be implemented in firmware, hardware, or a combination of the above. Indeed, certain performance gains may be obtained by offloading some aspects of processing done by DSS to specialized, or specially configured, devices. As a general matter, various embodiments of the DSS may run on a number of different computer devices, including, but not limited to, cell phones, smart phones, tablets, laptops, notebook computers, desktop computers, routers, switches, telephony devices, and computer servers. In the preferred embodiment, the DSS is implemented on one or more computer servers.

Figure 9:
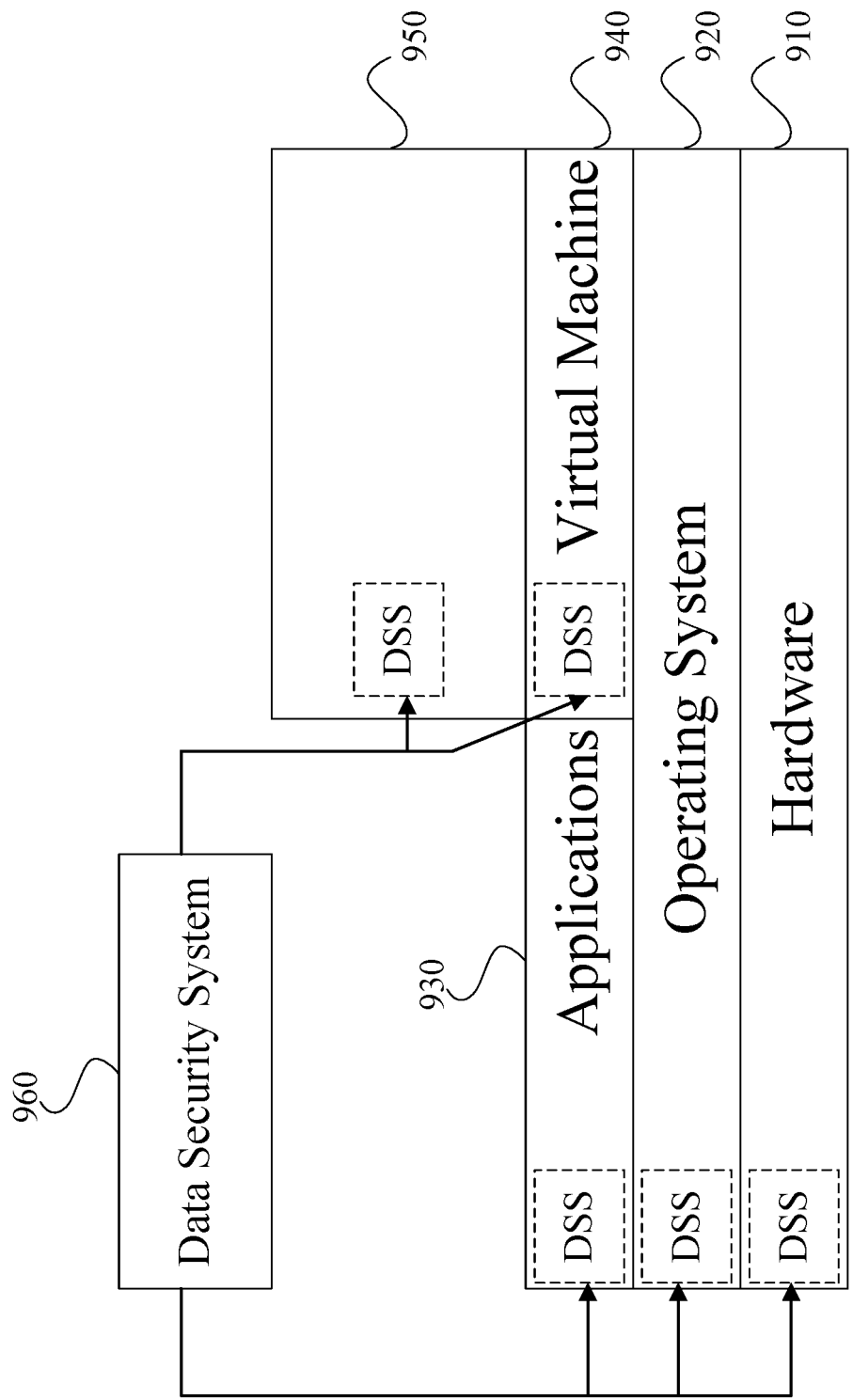
FIG. 9 illustrates an example of layers of a computer architecture.

FIG. 9 illustrates various layers that may be present in a typical computer system, including hardware layer 910, operating system layer 920, applications layer 930, virtual machine layer 940, and other software 950 running on top of the virtual machine. One of ordinary skill in the art will recognize that not all layers appearing in FIG. 9 necessarily appear in all computer systems. Indeed, numerous computers and devices do not run virtual machines, and some even run without applications. Data Security Module 960 ("DSM") is one embodiment of the present invention, and as shown in FIG. 9, the DSM may be implemented in a number of layers of computer architecture. In the preferred embodiment, the present invention runs on a dedicated server, or runs as one of several applications on a server.

Figure 10:
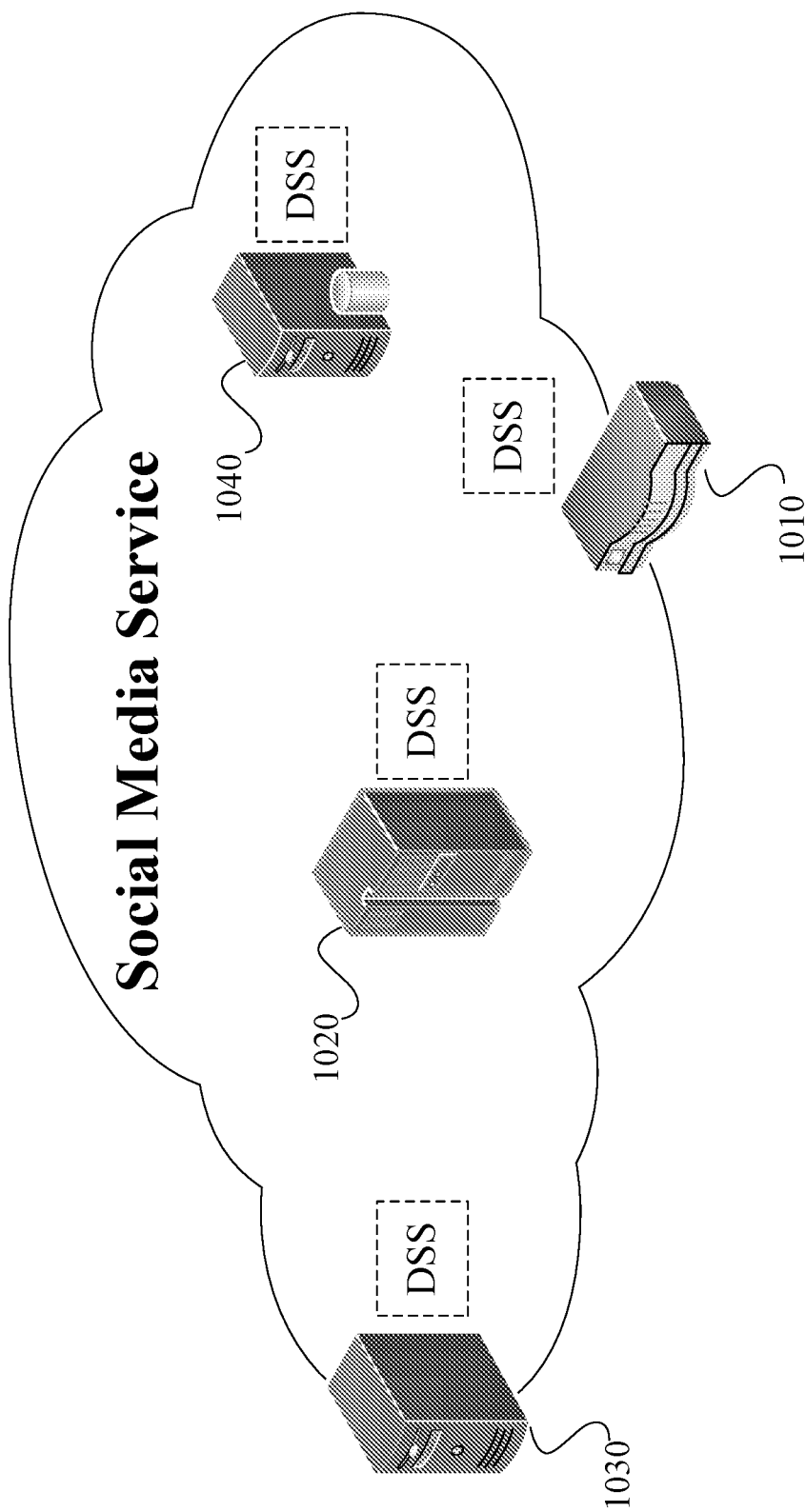
FIG. 10 illustrates an example of several computer components of a social media service.

FIG. 10 shows several embodiments by which a cloud service provider, such as a social media site, may implement the data security system disclosed herein. The site may include DSS functionality on edge device 1010, application server 1020, web server 1030, or even a dedicated DSS server 1040. It will be understood by one of ordinary skill in the art, that various modules of the data security system may be separated among multiple computer servers.

Figure 11:
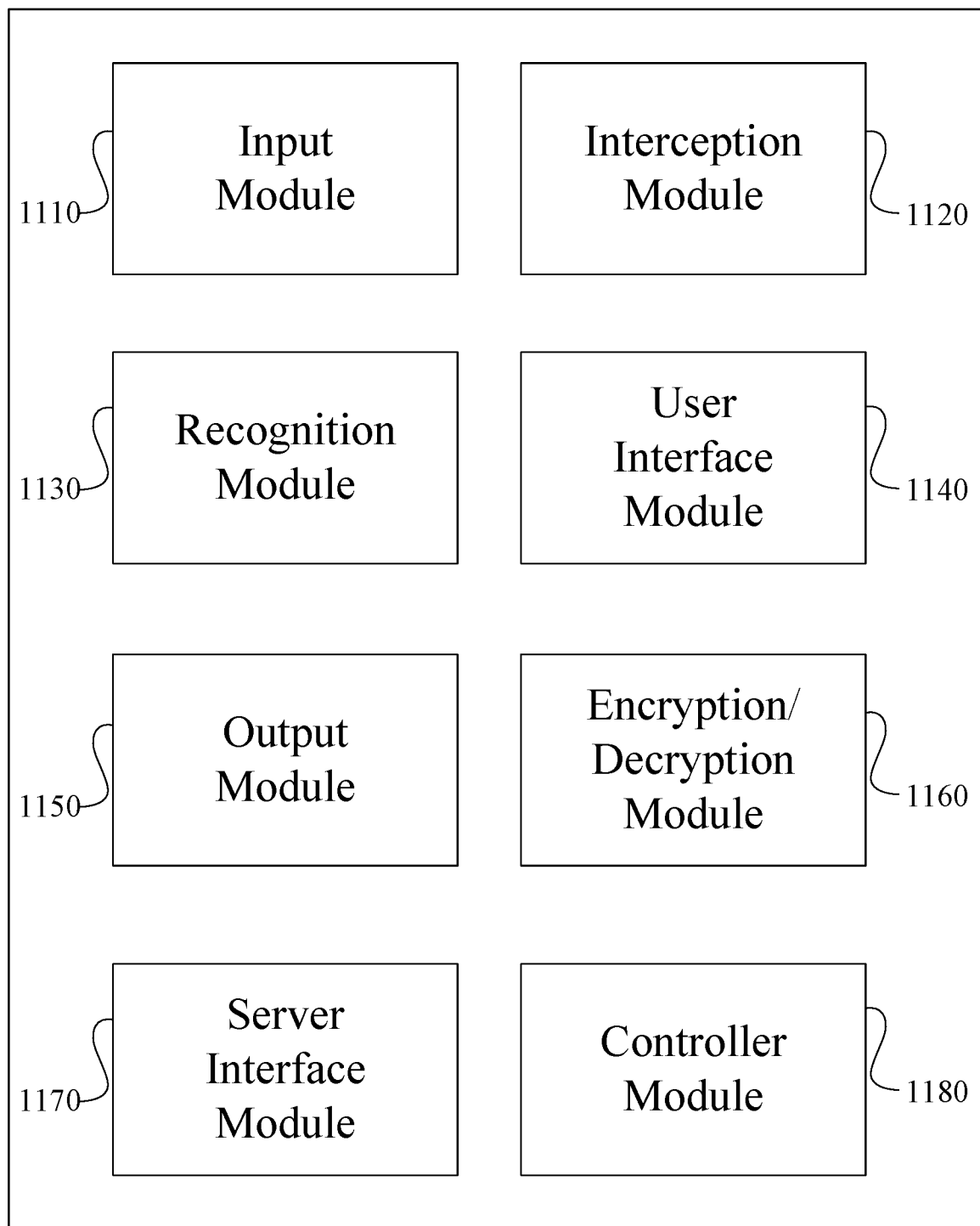
FIG. 11 illustrates several modules of one embodiment of the invention.

FIG. 11 illustrates various modules that may comprise the DSS, including Input Module 1110, Interception Module 1120, Recognition Module 1130, User Interface Module 1140, Output Module 1150, Encryption/Decryption Module 1160, Server Interface Module 1170, and Controller Module 1180.

In one embodiment, the DSS comprises an Input Module 1110 through which the DSS receives data requested to be shared or uploaded. In one embodiment, Input Module 1110 runs on a server and receives requests from users to share or upload data. The requests may first be received by an edge device, and forwarded to the Input Module. In another embodiment, Input Module 1110 runs on a mobile device, possibly as part of a social media or gallery app and is designed to receive requests to share or upload data from a user.

The DSS may also comprise an Interception Module 1120, which may, for example, be present on mobile devices as part of the operating system. In one embodiment, Interception Module 1120 intercepts requests to share or upload data by users, so that the requests can be vetted by the DSS. It will be understood that Interception Module 1120 may also run on a server.

In the preferred embodiment, the DSS comprises a Recognition Module 1130, which scans shared data for general or specific characteristics, such as text strings or images. Recognition Module 1130 is described in further detail in FIG. 12 and accompanying text. Recognition Module 1130, and one or more of its components, may reside on a mobile device, a server, or be distributed on multiple machines. In one embodiment, Recognition Module 1130 also determines the type of data requested to be shared or uploaded by the user.

In the preferred embodiment, the DSS comprises a User Interface Module 1140, which facilitates communications with users of mobile devices and other computers. User Interface Module 1140 may, for example, notify users that their attempted upload of data violates company policy, or unintentionally discloses confidential information. As with other modules, the User Interface Module 1140 may run on a mobile device, a server, or a computer, among other possibilities. It may also be distributed between the two.

Output Module 1150 is also present in some embodiments of the DSS. Output Module 1150 is responsible for processing, modifying, and/or forwarding user 'sharing' and upload requests in accordance with the rule sets. For example, if one of the implemented rules requires an automatic redaction of a user's social security number from a text or a photograph file, Output Module 1150 performs the redaction and forwards the file for publication to a server. Output Module 1150 may work together with other, more specialized, processing modules to attain performance improvements for its functions.

Some embodiments of the DSS comprise Encryption/Decryption Module 1160, which handles cryptographic communication from and to the DSS. In one configuration, where the DSS is running on a server, mobile and other devices may wish to encrypt communications to the DSS. However, communication within the server network may be unencrypted for efficiency and other reasons. In this scenario, Encryption/Decryption Module 1160 would decrypt communications received at the DSS server for further analysis and processing. When the DSS runs on a mobile device, Encryption/Decryption Module 1160 is configured to encrypt communications from the mobile device to a server.

In one embodiment, the DSS comprises a Server Interface Module 1170, which is designed to interface with one or more servers comprising the DSS or providing related services. Server Interface Module 1170 may provide several functions, such as configuring messages to comply with a communications protocol used by the DSS, or to send ancillary data to the DSS server. For example, a Server Interface Module 1170 running on a mobile device may periodically update the DSS server with information regarding a user's social media habits, such as frequency of visits, what kind of media the user prefers sharing, and collected information. This way the DSS may increase efficiency by routing requests from the user to servers better equipped to handle the user's preferences. In another example, a Server Interface Module 1170 running on a server can coordinate various DSS functions performed on several servers.

Certain embodiments of the DSS comprise a Controller Module 1180, which is responsible for managing the various modules, functions, and processes of the DSS. Controller Module 1180 may be implemented as a continuously running task that initializes and maintains all requisite processes. Under certain conditions Controller Module 1180 may shut down and re-activate other modules. Controller Module 1180 also coordinates the various components of the DSS in implementations where the DSS is distributed across multiple servers.

The DSS may comprise other modules, not shown in FIG. 11, with functions such as logging, backup, crawling, facial recognition, semantic processing, and all of the other functions that are disclosed herein.

The DSS, as disclosed herein, provides flexibility to its administrators and users, and therefore not all modules must be present in every embodiment. For example, not every implementation of the DSS must have an Encryption/Decryption Module, or an Interception Module. Further, since in some embodiments the DSS is implemented on a distributed system, some of the modules shown in FIG. 11 may run on different computers, or different portions of a single system. Moreover, functionality of some or all of the modules shown in FIG. 11 may be combined into a single module of software or hardware.

Figure 12:
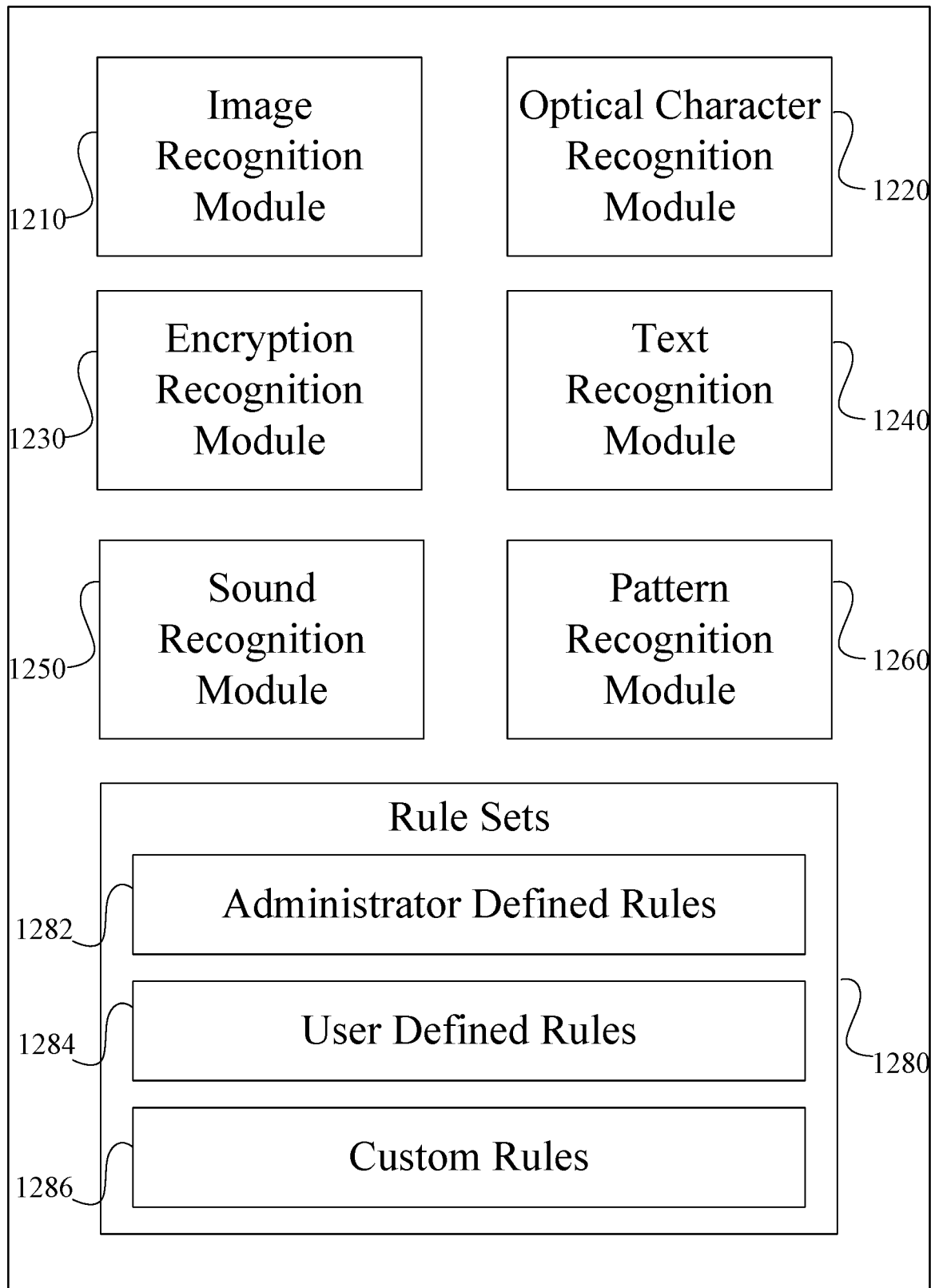
FIG. 12 illustrates additional modules of one embodiment of the invention.

FIG. 12 illustrates Recognition Module 1200, which is shown as module 1130 in FIG. 11. The primary purpose of Recognition Module 1200 is to scan user requests to share or upload data and to detect various patterns or items of information that the DSS is configured to safeguard. In some embodiments, Recognition Module 1200 is also configured to apply rule sets, or to compare user requests to share or upload data with various rules. Recognition Module 1200 may itself comprise one or more modules, such as Image Recognition Module 1210, Optical Character Recognition Module 1220, Encryption Recognition Module 1230, Text Recognition Module 1240, Sound Recognition Module 1250, and Pattern Recognition Module 1260. As noted above, in some embodiments, Recognition Module 1200 may also comprise one or more Rule Sets 1280.

The recognition modules identified above and in FIG. 12 can be implemented in a variety of ways. In one embodiment, the recognition modules are dedicated processors, each configured to process a certain type of data, such as images by the Image Recognition Module 1210, text by the Text Recognition Module 1240, and sound by Sound Recognition Module 1250. Thus, for example, Image Recognition Module 1210 ("IRM") may be a dedicated graphics board or software that sits idly until another DSS module feeds it with a photograph that a user wants to share on a social media site, and also with an image of a credit card that the DSS is configured to prevent from being publicly disclosed. This mode is referred to as "idle mode" herein. The IRM would scan the shared photograph, detect that the photograph also contains an image of the credit card, and report the finding to the DSS controller or other module. This implementation would, for example, prevent the type of inadvertent disclosure illustrated in FIGS. 5 and 6. In another embodiment, referred to as an "active mode" herein, instead of sitting idly until requested to analyze an image by the DSS, the IRM is constantly scanning uploaded photographs and other images for patterns such as faces, shapes of documents, and credit cards. This embodiment may improve efficiency and response times. In addition, this embodiment creates a number of other possibilities for the DSS, such as predictive scanning, described in further detail below. In other embodiments, referred to as "hybrid modes" herein, the IRM may behave partially as it would in idle mode and partially as it would in active mode, for example, by actively scanning for a particular type of image or pattern. The IRM may also work with video files, since video files are essentially collections of still images. In the case of compressed digital video, such as MPEG, the IRM would de-assemble various I, P, and B frames into individual components and scan them separately. One of ordinary skill in the art would recognize that efficiency improvements may be attained by combining techniques used in digital video and image compression to quickly scan moving pictures for specific patterns.

Turning to the other recognition modules, in the preferred embodiment Optical Character Recognition Module 1220 ("OCRM") is configured to scan images for text, in one or multiple languages. In the preferred embodiment, the OCRM is also customizable to include additional, previously undefined, symbols and characters, so that it is not limited to a predefined set of characters.

In the preferred embodiment, Encryption Recognition Module 1230 ("ERM") scans incoming data for the presence of encryption. This functionality is valuable to government agencies, defense contractors, and other organizations interested in securing highly sensitive information. In a possible scenario, a defense contractor employee may try to upload a text file containing encrypted specifications for a military system to a social media site or an unsecured server. While the text file may not trigger any alarms based on its contents, the ERM would detect the presence of encryption and at a minimum notify the DSS, and possibly DSS administrators that encryption was detected. Encryption/Detection Module 1230 may assist in decrypting the data. The ERM may also work together with other recognition modules to detect the presence of encrypted data in different types of media.

Text Recognition Module 1240 ("TRM") is preferably configured to detect various textual patterns in one or more languages. The TRM may work with other modules to help convert safeguarded information, such as a credit card number, to other forms of media, such as a sound file or an image. This way a credit card number stored in text will be scanned for by the recognition modules in textual, audio, and visual form.

If implemented, Sound Recognition Module 1250 ("SRM") detects various audio patterns in uploaded or shared data. The SRM works together with other recognition module to enable scanning for specific patterns in a multimedia environment. Thus, a password stored in an audio file, sounds connoting sexual activity, sounds of illegal activity, sounds of intoxication or other "controversial" activity, or other sounds. may be converted to other forms of media and scanned for using other recognition modules.

In the preferred embodiment, Pattern Recognition Module 1260 ("PRM") is one or more recognition modules that search for patterns of data in uploaded or shared user information. In one embodiment, the PRM may combine the features of one or several recognition modules in searching a hybrid data file. In another embodiment, the PRM may scan non-standard media files, such as those used for specialized industrial applications. For example, the PRM may be configured to scan a computer aided design file used by AutoCAD or SolidWorks for various patterns, including text and images.

Preferably, each of the recognition modules illustrated in FIG. 12 is capable of functioning in idle, active, and hybrid modes. In addition, each of the recognition modules is preferably capable of accepting various recognition settings, such that DSS administrators and users can fine-tune its ability to deal with different sound levels, image quality, and other parameters.

The Recognition Module embodiment illustrated in FIG. 12 comprises rule sets which provide criteria by which patterns in user data may be detected, and based on which actions may be taken. In other embodiments, the rule sets may be an independent module, of their own. Indeed, an entire database server may be dedicated to storing and providing rule sets upon request to the DSS. Further, the rule sets may be split into separate types of rules, such as, for example, rules for pattern recognition in user data, and rules pursuant to which the DSS makes decisions of what to do with user data that may, or may not, trigger a condition.

The Rule Sets 1280 illustrated in FIG. 12 may comprise different types of rules, including Administrator Defined Rules 1282 ("ADRs"), User Defined Rules 1284 ("UDRs"), and Custom Rules 1286 ("CRs"). ADRs are configured by administrators of the DSS, such as a network administrator at a Fortune 500 company that has implemented a DSS embodiment. UDRs provide users with an opportunity to configure their own safeguarding rules. CRs may include other types of rules, such as rules created by the DSS as part of predictive scanning. Various Rule Sets are described in detail further in the specification.

Implementation

Overview

Figure 13:
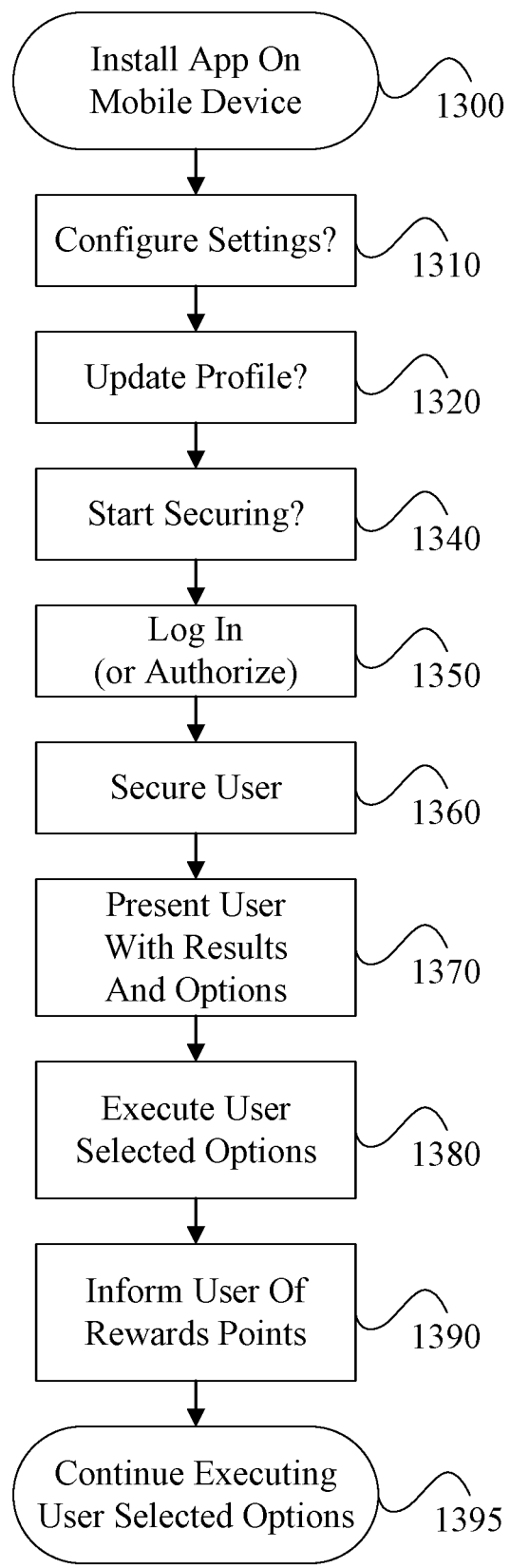
FIG. 13 is a flow chart illustrating one embodiment of functionality of the present invention.

One possible implementation of the DSS is illustrated in FIG. 13. At step 1300, a user installs a DSS app on his mobile device. Once installed, at step 1310 the app asks the user if he or she wants to configure settings now, or on the fly as the app detects potential social media issues. At step 1320, the app may also ask the user if he or she wants to answer certain questions whose answers the system could not, for whatever reason, gather from the user's social media profiles (e.g., user profession, home location, etc.). If the user chooses to configure on the fly, the app then indicates that it will now commence configuring itself and securing the user, and when the system detects issues based on a standard rule set it will prompt the user how to handle those issues for the current situation and for the future. If the user selects to configure it him or herself, the app provides the user with the opportunity to review the standard settings and variables—i.e., the items of interest that the DSS will look for in order to safeguard the user pursuant to standard rule sets—and to configure how the user wants the DSS to handle each discovered item. In some implementations of the invention there may be scoring involved—such that a rule may rate the discovery of a certain item as a risk on a scale of 1 to 100, for example, rather than a YES or NO match, and the user can configure how the various levels of risk should be addressed. For example, a user may configure the DSS so that scans for comments with specific offensive language are rated as a significant problem (by setting the appropriate score greater than alpha), and accordingly those comments should be immediately deleted. Scans for comments set to lower risk levels (defined, for example, by different words or text patterns) should be handled by simply notifying the user, or may be handled based on rules that provide for different actions depending on who has visibility. After finishing up its initial configuration, in step 1340 the DSS asks the user if it can now start securing. If the user says yes, the system will ask the user which social media venues to secure and at step 1350 either prompt the user for credentials to login to the various social media sites that the user wants secured or login using authentication capabilities of those sites (e.g., FACEBOOK™ Authentication). In implementation of the invention that run as social media apps (e.g., FACEBOOK™ apps) the login is not needed. Rather, the user may only need to 'authorize' the app.

The system may also ask the user if it can perform a full scan of each social media platform where the user has a presence. If the user wants to secure his FACEBOOK™ only, for example, in step 1360 the system will scan the FACEBOOK™ wall, configuration, newsfeed, timeline, friend list, friend pages, comments, and other parts of FACEBOOK™ looking for items that match any of the rules the user either configured or that come in the default configuration. If the configured system supports spidering it will do so as well. In step 1370, the DSS presents the user with results of its scans and crawls, noting which rules the results match, and provides the user with options on how to handle each match—for example, delete; delete and notify (the poster of the deletion and optionally the reason and the fact that this was done by the DSS); quarantine until a later time; modify (where applicable and possible to edit the matching content to remove the offensive element, or possibly asking the user how to modify the content. The DSS may also make suggestions regarding edits. Edits of content may also be more than simple edits of text. For example, if a user posts a picture of his or her first car, the system may suggest that besides removing it, the user may also consider making the picture viewable to only close relatives—who probably already know what his first car was anyway. After the user makes various selections prompted by the DSS, the DSS updates the user's configuration and executes the selected options accordingly at step 1380. The DSS may then inform the user that it will go into active-secure mode whereby it the DSS will monitor any posts the user makes to FACEBOOK™ via the mobile device as he or she makes them, perform a scan whenever a FACEBOOK™ notification comes in to the device, and scan for any FACEBOOK™ updates every X hours, minutes, or other period of time. The DSS may also ask the user if he wants to change any of these parameters. The DSS may also offer to inform the user of security updates, by, for example, sending email to the user's FACEBOOK™ inbox or other account. In step 1390, the system also informs the user that he will earn rewards points for using the DSS, and that he or she can redeem points by selecting the Redeem points function within the app. The DSS then continues executing with the updated options and securing the user from inadvertent disclosure of potentially harmful information (shown as step 1395). On subsequent starts, user input is not required, and the system may be configured to scan everything again periodically or to scan just the items that changed since the last scan. The above is one example out of many possible implementations of the invention.

In one embodiment, the DSS may be implemented as a cloud based FACEBOOK™ application that leverages the FACEBOOK™ API. The FACEBOOK™ API allows the application to receive data directly from FACEBOOK™ upon certain conditions. In this embodiment, the DSS app will use the so-called FACEBOOK™ Graph API which allows for communication of real-time updates to the app by providing it with a mechanism of subscribing to changes in data on FACEBOOK™. The DSS includes various modules described in the specification and drawings. The application runs on a server or set of servers at an Internet hosting facility (or other location) not belonging to FACEBOOK™ or to the user. In this embodiment, the DSS system's modules are running on Linux-based servers using an Apache web server and a Ruby on Rails application, all of which is hosted on a set of virtual servers at a third-party hosting center with high speed Internet connectivity. The Ruby on Rails application is a website that provides the interface for configuring user settings and for accepting data updates from FACEBOOK™. The DSS uses a standard MySQL database to store data settings and other data. Updates from FACEBOOK™ are received when a user using the DSS posts something on FACEBOOK™—regardless of how the post occurs. The communication of the update can be achieved in at least two ways: (1) FACEBOOK™ performs an HTTP POST to a URL on the DSS—as per the way the FACEBOOK™ API works, in which case FACEBOOK™ sends over the user's FACEBOOK™ user ID (which is a long number) as well as the data from the post and some other metadata; and (2) the DSS detects changes in the user's status by polling FACEBOOK™ and noticing a change from the last update by comparing the current status with the previous one. Whenever a user's FACEBOOK™ status is found it is stored in the database along with its FACEBOOK™ associated user ID so that it can be compared to the next one that appears, and so the scanner code (discussed below) can read it and scan it.

In addition to the software modules mentioned above there is also a scanning service running on the same server or on another server. In our example, the scanning service it is on a separate virtual server at the hosting provider. Whenever a new entry is put into the scan database the scanner runs. The scanning service uses standard string comparison libraries and natural language processing libraries, and calls them to perform one or more comparisons to the data from the rule sets that the user has chosen previously to enable.

This configuration is done by the user placing checkmarks in the checkboxes before each rule and selecting parameters from pick down lists on the configuration page. Contact preferences are set similarly—by placing checkmarks in front of the various options that the user wishes to select. The configuration setup page is served via the Ruby on Rails site running on Linux and Apache. All of the resulting settings are stored in a MySQL database. A user can have one or more rules in effect for the system to work, and one or more contact methodologies for it to contact him or her. So, a user may, for example, configure the system to not allow postings about vacations more than a certain distance from home unless the post is only viewable to his or her friends and family group but nobody else and to contact him or her via email and FACEBOOK™ message.

Once the user has authorized the application the system works as follows. The user enters a status update on FACEBOOK™, through whatever means he or she accesses FACEBOOK™, such as a web browser, dedicated client on tablet, dedicated client on smartphone, etc. Upon submission, FACEBOOK™ internal mechanism either posts the data to a DSS URL or the DSS polls FACEBOOK™ and sees the update. Since the DSS and FACEBOOK™ are not on the same server, TCP/IP communication over the Internet is used with standard HTTP or HTTPS (if encryption is enabled) to transmit the data. The DSS receives the update along with associated user information from FACEBOOK™, and scans it by applying natural language processing to the text, seeking to see if the text violates any of the rules mentioned in the rule set. This includes searching via readily available algorithms for specific keywords, strings, regular expressions, pattern matching, and combinations thereof. Analysis can include looking at geotag/check-in information, the actual text, metadata that comes along with pictures, and any other information visible, or invisible to users, that FACEBOOK™ relays with the update. Combinations of strings may also be detected. So, for example, "pot" may not set off an alert unless words like "grow," "smoke," or related terms and conjugations appear in the same quote, will not flag as an issue if the word "cook" or "stove" or other terms that indicate that the "pot" in question is not marijuana appears in the text, but will appear if other indications (such as the results of natural language processing algorithms) indicate that the content is referring to marijuana and not a cooking pot. Pictures may be analyzed using a facial recognition algorithm, fleshtone detections (too high a percentage of fleshtones coupled with shape recognition can indicate sexual content), object identification algorithms, and other image processing technologies that are widely available. Likewise, picture captions, hashtags associated with it, comments associated with it, and other text-based content that comes along with it can be analyzed to provide an indication as to whether the image is objectionable.

As it runs through the list of rules, if the DSS finds that any rule is violated it creates a message by concatentating into a long string the rule's description information, threat explanation information, and the actual text that triggered the rule violation. The system then pulls the relevant user's contact preferences from the database and sends that message string via any of the notification methods selected by the user. In our example, the user selected email—so the system transmits it via SMTP—crafting a standard SMTP message to port 25 of the local SMTP mail server—and sends a message for the user via the FACEBOOK™ API and TCP/IP back to FACEBOOK™. Alternatively, the system leverages GOOGLE™ Mail (GMAIL™) to which it communicates via SMTP over TLS using port 587 (per standard RFC 3207) or SSL (over port 465) or an SMS gateway to which it sends communication via that gateways API and TCP/IP (e.g., a post to a specific page on the gateway's HTTP server interface) for similar communication.

In this embodiment, users wishing to use the system need to authorize the FACEBOOK™ application—which they can do via FACEBOOK™ or from a page served via FACEBOOK™ that is branded to look like the application. After authorizing the application the user sets up which rules he or she wishes to be in place, and with what parameters, as well as his or her contact preferences.

In another embodiment of the invention, the DSS may run similar to standard Internet Security packages (e.g., antivirus packages), in that the user runs software on his or her computer and clicks "Scan FACEBOOK™ for potentially problematic items." The system may then either: (a) log into FACEBOOK™ as the user (via HTTP unseen to the user and polls the user's Timeline and Wall which it scans post by post and friend by friend and event by event, etc. for all (or some) FACEBOOK™ content (b) logs into FACEBOOK™ as the user (via HTTP unseen to the user and polls only items updated since the last scan) and does a similar scan on all new items, or uses the API to poll and scan either the entire user account or just the updates. A report is presented to the user at the end of the scan of any problematic items with recommendations as to how to address—in a fashion very similar to scans for viruses on a computer. The embodiment of the DSS could be combined with a scan of FACEBOOK™ walls for bad links as already exists for the best mitigation for both technical and human issues presented by social media.

In another example embodiment, the DSS could be implemented on an application-level firewall, or scanner of outbound data, where all data being posted to social networks from all users on the internal network(s) can be scanned and blocked if necessary. In this embodiment, the system would perform analysis of outbound data similarly to other embodiments described in the specification, but would occur at the gateway and leverage the existing communication channels of an app-level firewall or scanner of outbound data—which today scan for other types of issues, but not numerous types of items that can have negative consequences on people and organizations as described elsewhere in this document.

In another example, a user may run DSS software on his computer, such as a desktop, laptop, server, tablet, smartphone, embedded system, or any other form factor for a computer. The software may be an independent application, a web application, or it may be provided as a service by a SaaS provider. The user provides the DSS software with login credentials to his various social media accounts, or social media repositories, and the DSS logs in to these sites, scans the sites, and produces a report for the user of potential issues for him to address together with an explanation as to what may be problematic about each discovered item of interest, and optionally provide a link or other address for each item. The scanning may be run manually, at specific intervals based on time in a fashion similar to the way many anti-virus scans are run, in conjunction with a scan for rogue links on a FACEBOOK™ wall, or using some other scheduling system. The user may address these issues independently of the DSS, or with some automated assistance as described in the preceding example.

Figure 14:
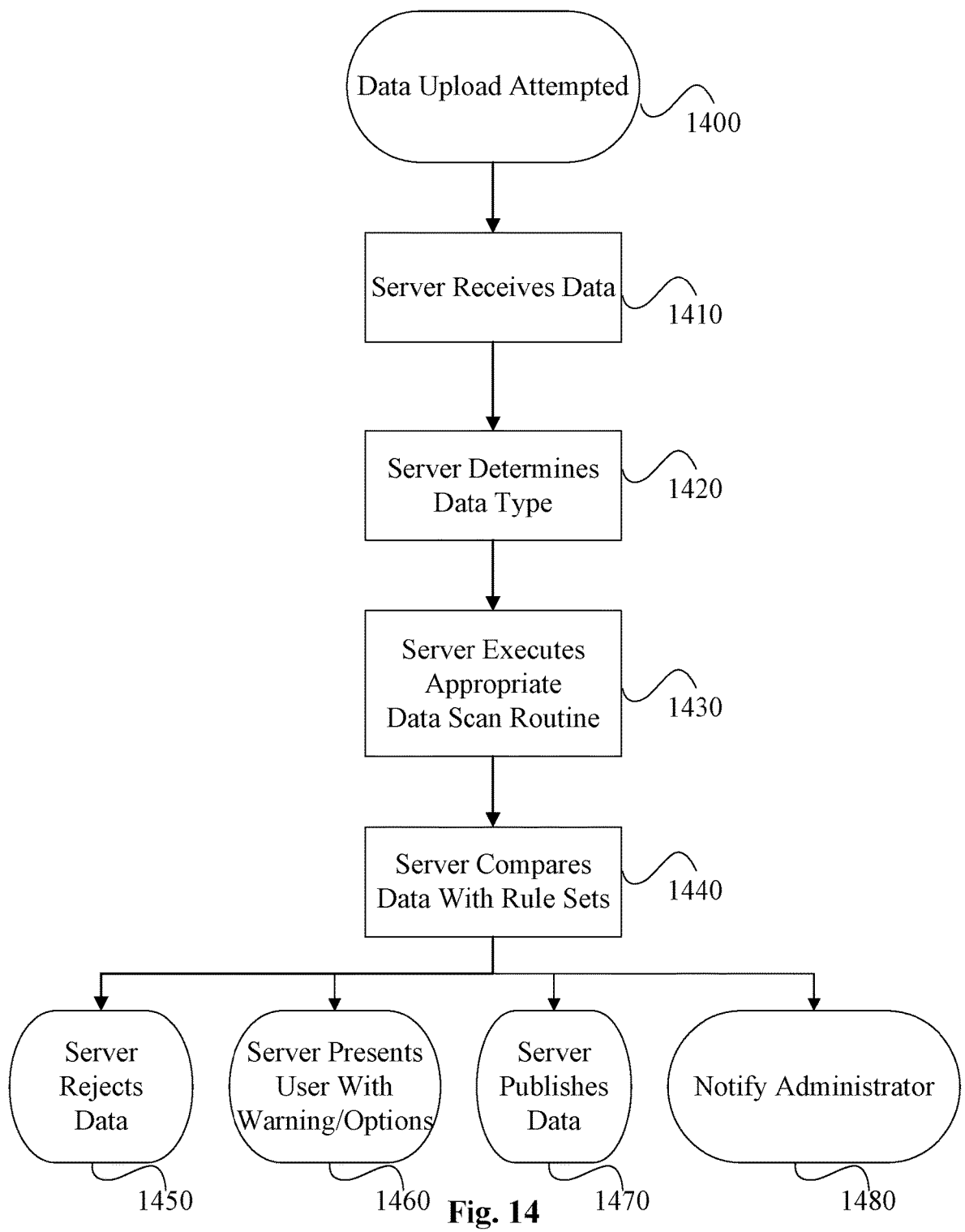
FIG. 14 is a flow chart illustrating one server based embodiment of the present invention.
Figure 15:
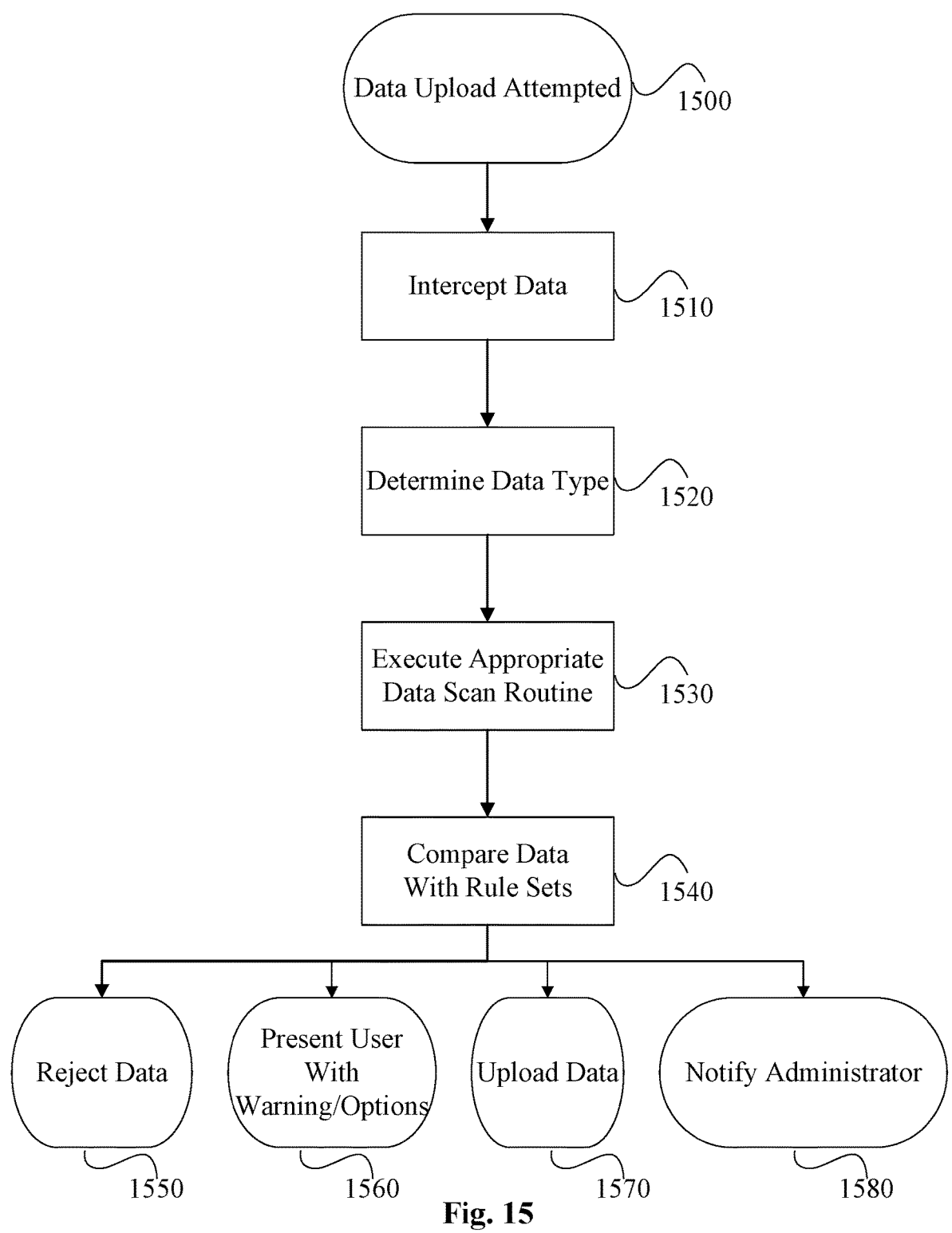
FIG. 15 is a flow chart illustrating one mobile device based embodiment of the present invention.
Figure 16:
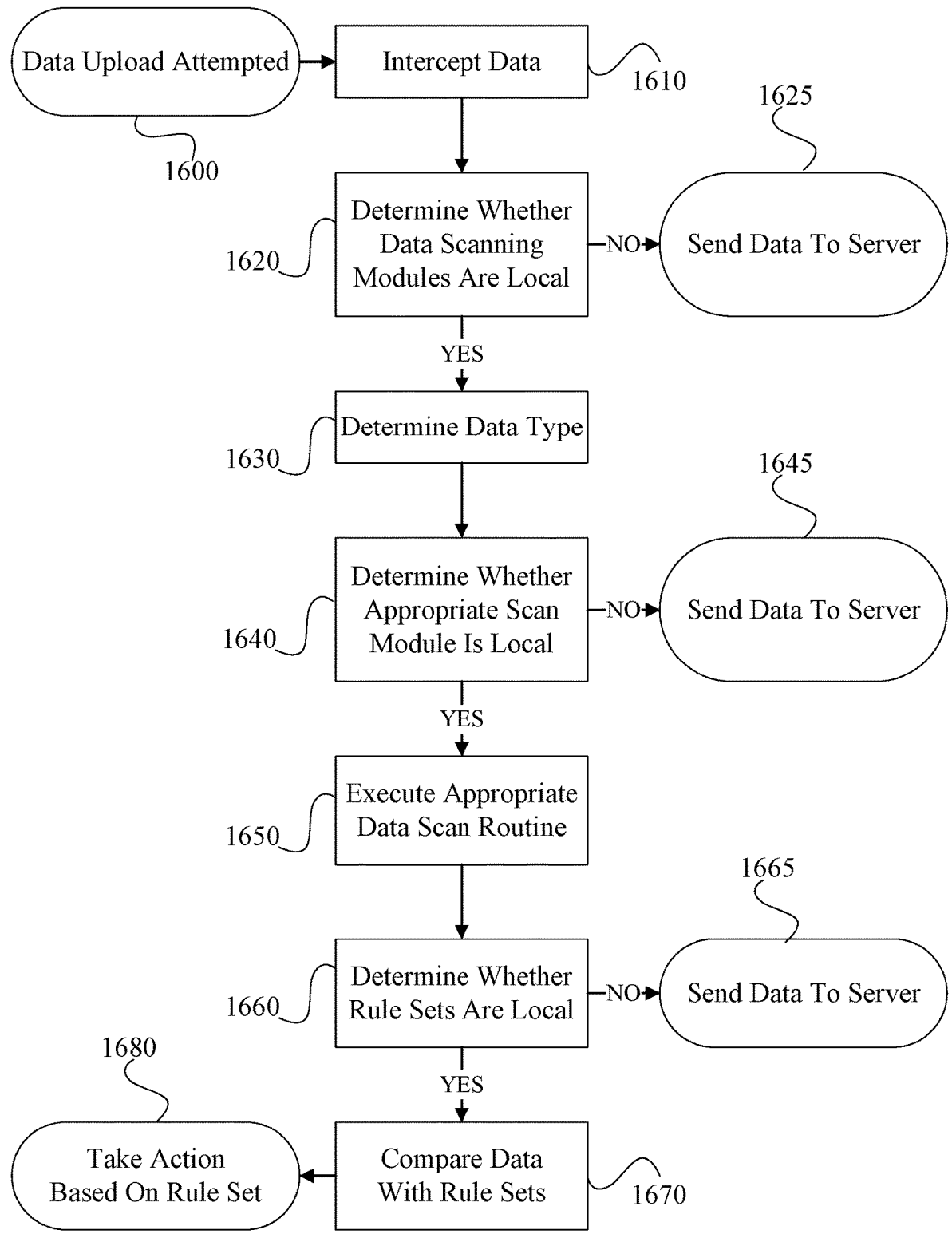
FIG. 16 is a flow chart illustrating one distributed embodiment of the present invention.

FIGS. 14-16 illustrate various processes employed by the DSS in the context of server-based, local, and distributed embodiments. FIG. 14 is a flowchart illustrating one of many possible server-based embodiments of the DSS. At 1400, a data upload, such as the sharing of a text post, photograph, or video is attempted by a user. At step 1410, the DSS server receives the data attempted to be uploaded by the user. At 1420, the server determines the type of data attempted to be uploaded, such as text, geographic location, images, video, audio, or other type. At 1430, the server executes appropriate scanning routines, by employing, for example, one or more of the recognition modules described in FIG. 12 and accompanying text. At 1440, the server compares data and/or results of the data scan routine with available rule sets. Based on the performed comparison and available rules, the server may then reject the data (step 1450), present the user with a warning and options (step 1460), publish the data or make it publicly available as requested by the user, or in some modified form (step 1470), or notify a system administrator (step 1480). It should be noted that one or more of the steps described above, such as steps 1430 and 1440 may be merged into a single process or step for improved efficiency or other implementation reasons.

FIG. 15 is a flowchart illustrating one of many possible local embodiments of the DSS. At 1500, a data upload, such as the sharing of a photograph is attempted by a user. At 1510, the DSS or a DSS module intercepts the data requested to be uploaded by the user. At 1520, the local DSS implementation determines the type of data attempted to be uploaded, such as text, geographic location, images, video, audio, or other type. At 1530, the local DSS implementation executes appropriate scanning routines, by employing, for example, one or more of the recognition modules described in FIG. 12 and accompanying text. At 1540, the local DSS implementation compares data and/or results of the data scan routine with available rule sets. Based on the performed comparison and available rules, the local DSS instance may then reject the data (step 1550), present the user with a warning and options (step 1560), upload the data as requested by the user or in some modified form (step 1570), or notify a system administrator (step 1580). As before, it should be noted that one or more of the steps described above, such as steps 1530 and 1540 may be merged into a single process or step for improved efficiency or other implementation reasons.

FIG. 16 is a flowchart illustrating one of many possible distributed embodiments of the DSS. At 1600, a data upload, such as the sharing of a photograph is attempted by a user. At 1610, the DSS or a DSS module intercepts the data requested to be uploaded by the user. At 1620, the local DSS instance determines whether data scanning modules are local or server-based. If the data scanning modules are server-based, at 1625 the DSS instance sends data requested to be uploaded, together with ancillary data and metadata to the server for further processing. If the data scanning modules are local, at 1630, the local DSS implementation determines the type of data attempted to be uploaded, such as text, geographic location, images, video, audio, or other type. At 1640, based on the data type, the local DSS instance determines whether appropriate scan modules, such as an Image Recognition Module appropriate for a photograph, are local. If the appropriate scanning module is not local, at 1645 the DSS instance sends relevant data, together with ancillary data and metadata to the server for further processing. If the appropriate scanning module is local, at 1650 the local DSS instance executes the appropriate data scan routine employing, for example, one or more of the recognition modules described in FIG. 12 and accompanying text. At 1660, the local DSS instance determines whether rule sets are local. If rule sets are not local, at 1665 relevant data, together with ancillary data and metadata to the server for further processing. If rule sets are local, at 1670, the local DSS implementation compares data and/or results of the data scan routine with available rule sets. Based on the performed comparison and available rules, at 1680 the local DSS instance then takes action with respect to the data requested to be uploaded by the user. As before, it should be noted that one or more of the steps described above, such as steps 1650 through 1670 may be merged into a single process or step for improved efficiency or other implementation reasons. Furthermore, in other embodiments, the DSS may skip certain of the steps illustrated above instead of performing the operation locally or sending data to a server for further processing. One of ordinary skill in the art would recognize that the steps illustrated above may be performed on the mobile device, server, or other computing device, depending on the implementation of the DSS. The purpose of FIGS. 14-16 is not to limit the invention to a particular configuration, but rather to illustrate the flexibility of the invention.

Scanning

As previously introduced, scanning refers to the process or mechanism for detecting various, potentially harmful, items of information relating to a user that are about to be, or have already been, posted online. Scanning may be implemented using one or more modules illustrated in FIGS. 11 and 12. From an implementation and configuration perspective, scanning may be done in real time as a user enters information into a social media site; in batch mode; constantly; when contacts are added; when specific actions are taken; when events are viewed or agreed to; when a user confirms information; when profile information is added or modified for the user or for a contact; when a communication is received; in a combination of the above, or based on other triggers.

Furthermore, the DSS can be configured to scan only when a user makes an update or is notified of an update (so that it would address both posts made by a user as well as posts made by others' linking or tagging to the user). For example, if a user X posts a comment on user Y's FACEBOOK™ wall, FACEBOOK™ notifies user Y that a comment has been posted. In one embodiment, the DSS sees the notification and scans the comment as well as the original post and all other comments on it, including any links, images, or other attachments. In this example, the DSS accesses its rule sets, and determines that the user wants to be prompted to consider removing this type of comment—but not the original post or other comments, and the user wants this prompt via a message in his FACEBOOK™ account as well as via a text to his cellphone. The DSS complies and sends the FACEBOOK™ and text messages. The user can then reply to the message with a command to remove it, manually remove the offending material, or leave it, among other options.

In one example of scanning, the DSS would scan a user's FACEBOOK™ profile, friend list, settings, wall and/or timeline and/or newsfeed tagged items, such as photos, videos, posts, and comments, by other users as well as the user, any specific hashtags selected for scanning, and any other items on FACEBOOK™ related to the user for potentially problematic items. Depending on the rules that the user has accepted as part of his or her configuration, and based on the actions the user has set for those rules, the invention might, for example, flag a post about the user picking up his daughter at day care as risky and prompt the user what to do with it. Based on the scan, the DSS might remove a user's comment that contains a vulgarity as well as send a message to the user who used the vulgarity (via private FACEBOOK™ messaging, for example) that the comment was removed automatically by the DSS due to containing vulgarity and that he or she is invited to both re-comment without the vulgarity as well as utilize the invention for his own security. In another example of scanning, the system may note that a check-in, posting, or a photo that the user has posted (e.g., with geotagging or with images of recognizable places), is showing the user 1,000 miles away from home and taken on the day of the posting and warn him that it may be safe to post this once he has returned home rather than while away (or may automatically delay the post until the user "checks in" or notes that he is back home or closer to home), while allowing without warning a check-in, posting, or photo taken 1,000 miles away but taken two days earlier when the user has already made postings from home again. In other examples of implementation, if a user attempts to post something controversial, the DSS may warn him before allowing the post to even be made—not just by scanning reactively, but also proactively preventing "bad" materials from ever appearing in the social media altogether. Of course, numerous other items may be scanned for and addressed by the DSS on FACEBOOK™, TWITTER™, INSTAGRAM™, SNAPCHAT™, TUMBLR™, PINTEREST™, FOURSQUARE™, GOOGLE+™, and other social media sites, as discussed in the rules section below. Likewise, the invention can be used to scan blogs—the posts and associated comments—and other forms of quasi-social-media for the same types of issues as exist with "pure" social media.

In the preferred embodiment, the DSS is capable of scanning not only messages and other information shared by the protected user, but also, as introduced earlier, but also scanning of messages and other information shared by another user that may impact the protected user. In other words, the DSS may be configured to scan all social media, and other publicly available information, that implicates the protected user, and not just comments posted by the protected user. Furthermore, the DSS may be configured to expand its scanning profile to include items that by themselves do not trigger any of the set rules, such as, for example, by noticing that a large number of objectionable comments were caused by a seemingly innocuous original post.

In another embodiment, the DSS would enable a user to remove something that may cause a problem for User X—even though User X may have no authority to remove it on his own. This might be a photo showing User X, for example, but in which he is not tagged. In another embodiment, if the DSS is incapable of causing removal of the photo, the DSS would enable a user to request the poster, or the hosting site, or service to remove the photo. As explained earlier in connection with the recognition modules in FIG. 12, such a photograph could be found using commercially or specifically developed technology for face recognition (e.g., by leveraging existing facial recognition technology and algorithms), which may be used in combination with the spidering mechanism described below.

Figure 17:
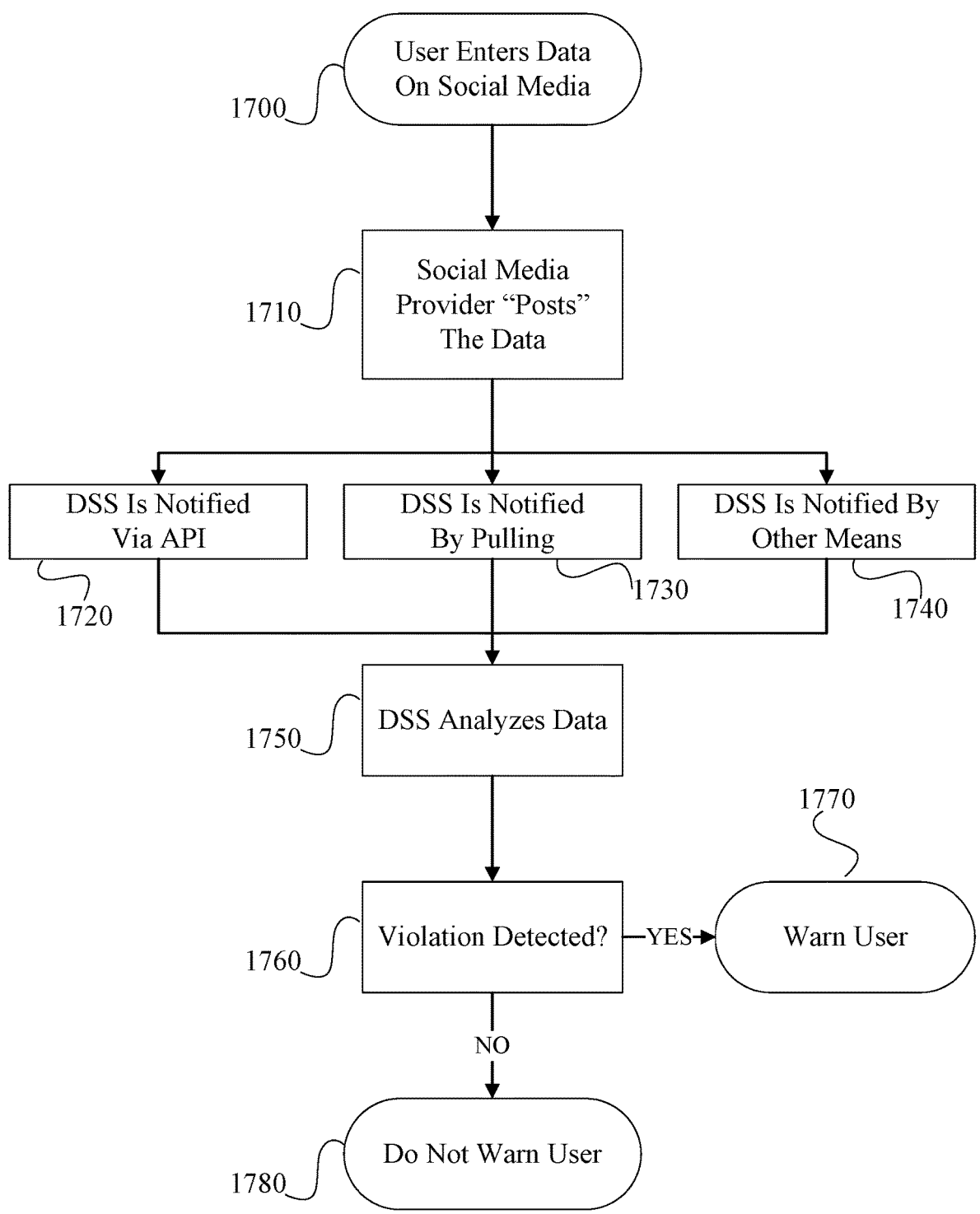
FIG. 17 is a flowchart illustrating one embodiment of after-posting scanning of the present invention.
Figure 18:
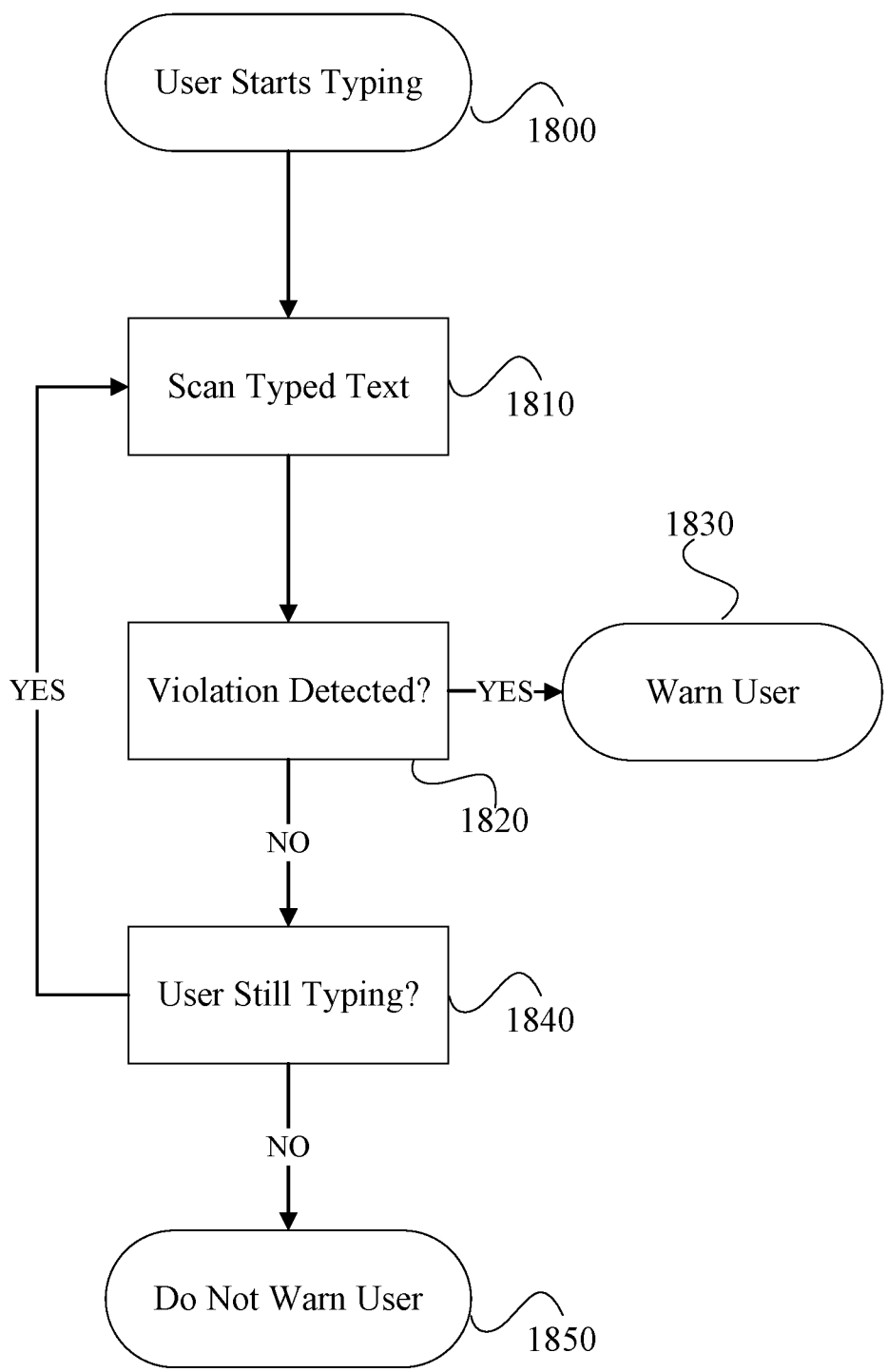
FIG. 18 is a flowchart illustrating one embodiment of continuous scanning of the present invention.
Figure 19:
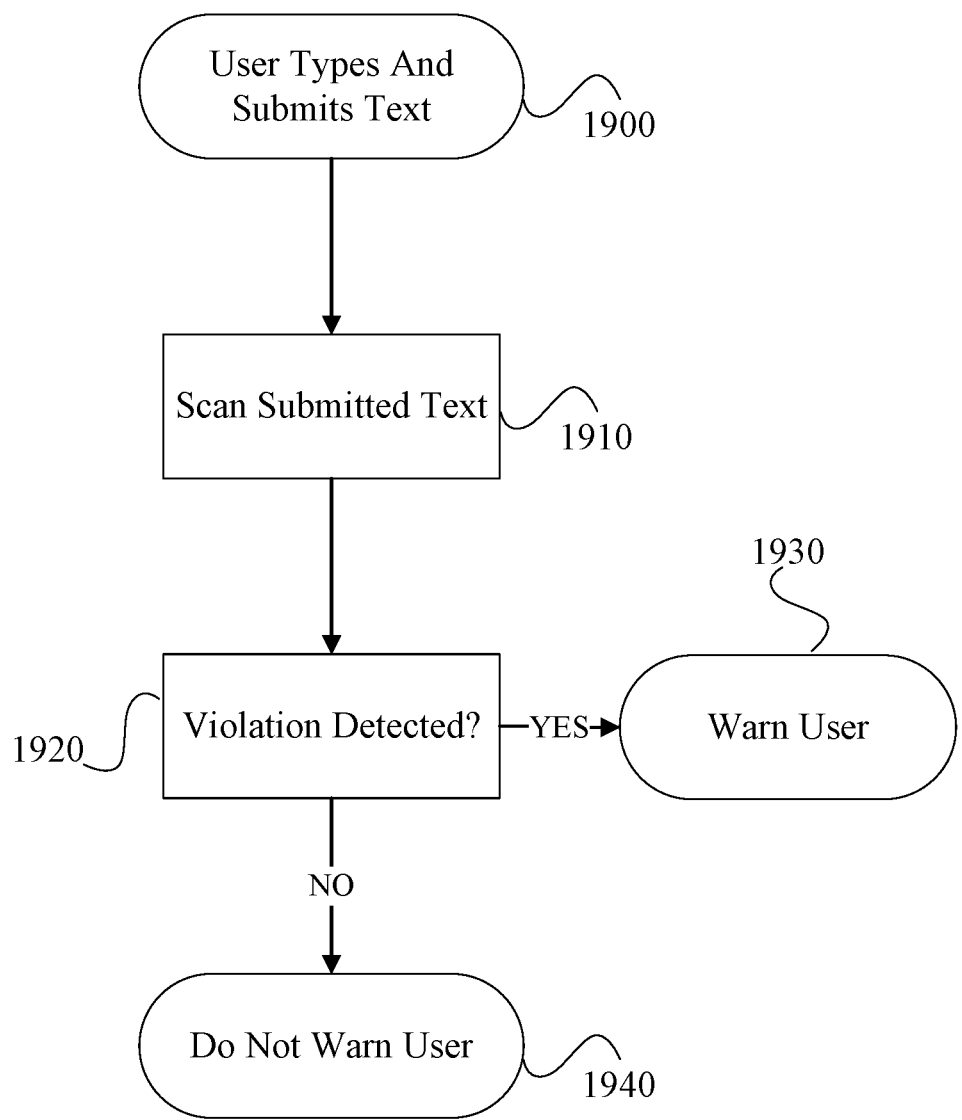
FIG. 19 is a flowchart illustrating one embodiment of scanning of submitted text of the present invention.

FIGS. 17-19 illustrate several embodiments of the DSS as implemented in relation to social media. FIG. 17 is a flowchart of steps taken by one embodiment of the DSS that is implemented separately from the social media provider. In step 1700, a user enters data into social media, for example by submitting a message in the FACEBOOK™ app on a mobile device or through the FACEBOOK™ website. The social media provider (FACEBOOK™ in this example) posts, or publishes, the user's message in step 1710. In steps 1720, 1730, or 1740, the DSS, which in this embodiment is running on a computer server, receives notice of the user's post. The DSS may be notified via the social media provider's API in step 1720, by pulling data from the user's social media account in step 1730, or other notification mechanism in step 1740. The DSS then analyzes the user's posted data in step 1750, and compares it against relevant rule sets in step 1760, possibly by employing the architecture illustrated in FIGS. 11 and 12. As noted earlier, the rule sets may include patterns that will be scanned for by DSS's recognition modules illustrated in FIG. 12. If a rule is violated or triggered in step 1760, the DSS warns the user in step 1770. Otherwise, at step 1780, the DSS does not warn the user does not interrupt the user's activities.

FIG. 18 illustrates one embodiment of the DSS which has been integrated into a social media provider. Here, as the user starts typing text in step 1800, the DSS begins scanning the typed text in step 1810, and comparing it with relevant rule sets in step 1820, possibly by employing the architecture illustrated in FIGS. 11 and 12. As noted earlier, the rule sets may include patterns that will be scanned for by DSS's recognition modules illustrated in FIG. 12. If a violation or triggering of a rule is detected in step 1820, the DSS warns the user in step 1830. If no violation is detected, the DSS determines whether the user is still typing at step 1840, and if so, goes back to step 1810 to scan the typed text. If the user is no longer typing after no violation was detected in step 1850 (e.g., the user pressed 'enter'), the DSS does not warn the user. Depending on the implementation, this scanning method may be employed and repeated after every character, word, sentence, paragraph, or other metric, beginning after a specific number of characters, words, sentences, etc. have been typed. The benefit of this embodiment is that the user is warned of potential issues before he or she even hits the 'submit' button in the social media app.

FIG. 19 illustrates another embodiment in which the DSS has been integrated into a social media provider. Here, the user enters and submits text in a social media app or via a website at step 1900. The DSS scans the submitted text at step 1910, and if a violation or triggering of a rule is detected at step 1920, the DSS warns the user at step 1930. If no violation or triggering has been detected, the DSS does not warn the user and his or her activities proceed uninterrupted. It should be noted that the user warnings in FIGS. 17-19 may be more than simple warnings, as described herein. The warnings may include other options, such as Ignore, Modify, Remove, and others options described herein.

The following are several examples of the DSS as it may be implemented on several major social media sites.

As one example, the DSS may scan a user's PINTEREST™, INSTAGRAM™, or other account and check for controversial images and text. For example, a political cartoon may be detected and the user warned if the user has a rule that political cartoons should be addressed via a warning. Scanning can determine this by looking at album names, board names, captions, etc. or by recognizing the image by matching it with others or through heuristic analysis. The DSS may scan for copyrighted materials and check that the user has not PINned any items that the owner does not want PINned by others.

In another implementation, the DSS may check a TWITTER™ or LINKEDIN™ feed for posts of a potentially problematic nature. Many of the examples disused earlier in relation to FACEBOOK™ would apply here and more are discussed in the rules section below. For example, depending on the user's configuration choices, as discussed earlier, links to controversial sites, pages, and the like, may be detected and flagged. Postings that the user is at a specific location may be flagged. As the user attempts to make a new post, it may be examined and addressed in real time as described earlier as well. In the case of LINKEDIN™, connections to new parties at the same firm may indicate to others about potential business activity with that firm.

Also, in the case of TWITTER™—any tweet message that the user receives (e.g., a tweet that mentions the user's @name) may be checked by the DSS—and any text, links, images, or videos in it or linked to it checked so that the user can be notified of any problems prior to replying. If other users are flagged in it with their @names checks could be done on those user accounts. Furthermore, as described with respect to FACEBOOK™, the sender's earlier posts, photos, videos, and links can be checked to help the user ensure that he is not getting involved in a public discussion with someone controversial. For example, if images that that user posts have been flagged as potentially graphic by TWITTER™, perhaps the user does not want to reply, so the DSS will address this issue according to the user's settings. The DSS may take a similar approach if another user's profile contains information that would make the other user likely not someone with which the DSS user wants to be publicly associated. It may scan a list of the users following the user being secured by the DSS, and may scan the list of all users he or she is following—with the goal of finding controversial users, problematic users, and/or phony users. Names, TWITTER™ handles, and words and phrases in the user descriptions of these users may be scanned as well. All of the decisions as to what to check, how to handle, whether to apply rules to other users' data, etc. are potentially configurable by the user or a DSS administrator.

FOURSQUARE™ check-ins would also be checked against rules if the user so desires. The user may allow check ins within a certain distance from his home, for example, but not far away since that could instigate break in attempts. Other stricter or more lenient policies (rules) could also be set up by, or for, the user (or by a business administrator, in the case of a business implementation of the DSS which is propagating configuration and rules to users as is discussed elsewhere in other sections of the specification).

Posts to gaming sites would be similarly addressed—especially the feeds which contain user to user and user to group dialogue. Likewise, sites of potentially controversial groups, firms, products, organizations, and other entities, would be addressed. It should be noted that in the specification and drawings, controversial does not necessarily include only things that are controversial on a macro scale, but also those controversial on a micro-scale. For example, things that are not controversial for the average American, may be controversial for members of a specific religious order, ethnic background, or other group, things that are not controversial for the average person may be controversial for an employee of a specific company, etc. In other words, controversial content or actions may be harmful to the DSS user, or they may be harmful to someone else. Circumstances that allows data to leak that may lead to a negative consequence for the user of the DSS may be inherently controversial or problematic.

In other embodiments, the DSS scans security settings on social media sites as well as profile information for a user, along with the user's Likes (in the case of FACEBOOK™) for potential issues, as well as their Friend list for potential issues (in the case of FACEBOOK™), Contacts in the case of LINKEDIN™, their followers and those they are following in the case of TWITTER™, and similarly all parties who are connected with them in the case of other social media platforms. A user who has Liked something controversial should be warned. Events that a user has been invited to (whether accepted, rejected, or not) may also be scanned—as events can lead to increased chances of break ins, controversial activity, undermining claims made in lawsuits, disability or workers compensation applications, or put the user at risk of being mugged (e.g., a user who says he is attending a particular jewelry show at a particular time on a particular date may expose him or herself to a mugger knowing to follow the user afterward).

Figure 20:
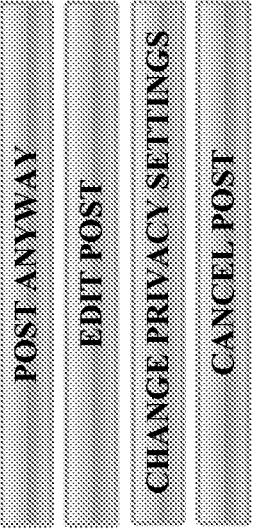
FIG. 20 illustrates a warning notification presented by one embodiment of the present invention.

FIG. 20 illustrates one embodiment of a user notification. In FIG. 20, a user attempted to post about his or her daughter's first day of school. The DSS, pursuant to a configured rule set, determined that the textual post poses a concern. In FIG. 20, the DSS presents the user with the text of his or her attempted post; the current status of his or her privacy settings (which happen to allow anyone to view the user's posts); and what the potential concern is with the user's post (that the post will tell anyone in the world where the user's daughter goes to school). The DSS also presents the user with four selectable options: POST ANYWAY; EDIT POST; CHANGE PRIVACY SETTINGS; and CANCEL POST. One of ordinary skill will recognize that many other warnings and notifications are possible, both from the perspective of rule sets and also from the interface perspective.

Turning to the computer-based implementation of the scanning process, FIGS. 11, 12, and accompanying text describe several embodiments of computer architecture capable of supporting scanning operations. One of ordinary skill in the art will recognize the existence of many known algorithms for analyzing text (which in the context of the DSS may include posts, comments, photo and vide captions, profile data, and other representations), including numerous semantic processing algorithms, Natural Language Processing algorithms, and various forms of pattern matching and pattern recognition. Any one or more of them may be used in an implementation of the DSS. Further, performing scans for certain keywords, phrases, and applying contextual analysis when necessary, are all examples of scanning that may be employed by the DSS. Moreover, scanning for specific settings in various social media platforms may also be achieved, for example by simulating web or mobile access to those settings or polling them directly from a social-media app. As described earlier, users or administrators will be able to configure which keywords they care about, as well as topics and concepts (which could be converted to keywords and natural language analysis by the one or more modules of the DSS or by an ancillary apparatus or process). For example, if a user selects a "no sports" pictures setting, the DSS would know to look for terms like "baseball," "football," or "hockey" in its textual and OCR scanning.

As described in the previous paragraph, techniques for computer understanding of human text are well known and widely available. However, in certain embodiments, the present invention builds on those techniques by applying language analysis to comments and posts that link to the protected user's posts; link to posts about the user; or that reference the user to determine the possible problems with prior comments and the original post. For example, if a user posts a photo of himself at a party with several unnamed and untagged people, and one of the comments says "Wasn't so-and-so just arrested for running a Ponzi scheme" then the DSS may not only flag the comment, but the original post as well, and depending on the settings would warn the user not just about the comment, but about the photo itself, since the photo may be showing him with a known criminal, possibly also allowing the user the option to remove the photo.

Another aspect of the present invention is the ability to provide oversight capability to certain people, such as parents, company management, and system administrators, referred to as overseers herein. In implementations involving overseers, the person being overseen is referred to as a user for the purpose of differentiating the two, even though both the 'user' and the 'overseer' derive benefits from the DSS. In oversight implementations, the DSS is capable of providing notification services in a variety of ways, including:

notifying only the user, but not the overseer;

initially notifying only the user, but if the user does not act on the notification within a specified time period, also notifying the overseer;

initially notifying only the user, but if the user does has previously not acted upon notifications (the number of notifications and length of the time period being configurable by the overseer/organization implementing the invention), also notifying the overseer;

notifying only the user unless the rule that triggered the notification is specifically flagged for notifying the overseer (as could be the case if something especially problematic is detected—for example, if the user accidentally posted quarterly figures before the official announcement, certain actions may be required of the business by law, and the business would want to know about what happened);

notifying both the user and overseer—for example, if the monitored account is an official business account, the business would want to receive notifications for that account as well as the employee user of that account. Similar considerations would apply to an official TWITTER™ feed for "Business X's CTO" for example, which is used for thought leadership and updates related to technology at Business X;

notifying only the overseer, for example in the event that potentially criminal activity is detected; and/or a combination of these types of rules depending on the group the user belongs to and the type of user, where, for example, the configured rule policies may be different for the CTO than for the mailroom clerk.

One of ordinary skill in the art would recognize that numerous ways of notifying users, overseers, and administrators of the DSS are possible, including email; text message; message via a social network; by color or pattern coding messages, posts, and other indicators in their social media; phone call; voice message; by color or pattern framing images or videos within their social media; including icons or labels near posts, messages, pictures, videos, sounds within their social media, pop-up screen, vibration, or by other mechanism.

The DSS may be configured to perform Predictive Scanning; that is, scanning that is not based on a pre-defined and static set of rules, but scanning based on the ever changing landscape of publicly available information and threats. As one example of our changing threat environment, in the 1990s it was fairly common to find social security numbers on various documents like pay stubs, and credit card numbers on receipts. At the present time, however, seeing one of those numbers on a public printout would be seen as a major blunder, and action would be taken to eliminate the printout as soon as possible. In this scenario, Predictive Scanning would constantly update its definitions to find evolving threats. In some embodiments, Predictive Scanning would work in conjunction with spidering, described in more detail below. One of ordinary skill in the art would recognize that numerous algorithms exist for performing adaptive, or predictive, tasks, such as neural networks, radial basis functions, support vector machines, Bayesian processes, the nearest neighbor algorithm, and geospatial predictive modeling. This list is not exclusive; rather, it provides some examples of methods that may be used to implement Predictive Scanning functions of the DSS.

Spidering

Some embodiments of the present invention may implement a capability referred to as spidering herein. Spidering refers to methods of searching for, and possibly collecting, information relating to a user that may be available from social media and other sources on the Internet or locally. The following embodiment of spidering is presented here in the context of FACEBOOK™ but applies to all social media in a similar fashion. In spidering, the DSS would scan all of a user's material, all of his friends material, all of his friends' friends material (and so on), to the extent the content is available, in order to find any references to the user or any content that relates to the user. The content so scanned is compared against the configured rule sets, and determined whether violations or triggers occurred. If the content cannot be edited or removed, messages may be sent to the users who own the content asking them to remove/modify it and offering them the services of the invention to secure themselves as well. Preferably, the user would also be notified of the results and be offered the ability to address them as well. Such messages could identify themselves as auto-sent by the DSS, even in cases in which approval needs to be given by the user after the system finds the need to send the messages via applying the rules. The user, either through some console interface, an app, or by replying to messages sent by the DSS by email, messaging, within TWITTER™ message/tweet, FACEBOOK™ message, or outside social media, could approve the sending of the messages to the other parties.

Further, in some embodiments, the present invention enhances security by taking into account current events. Since social media users often discuss current events, the DSS may be configured to focus particular attention on items of current events that may be controversial. For example, the DSS may access a server that contains information about current events with information about what might be controversial. For example, social media posts from June of 2012 regarding George Zimmerman and Obamacare are likely to elicit strong opinions, and therefore terms and words associated with these stories found within a user's posts or comments or comments on his or her posts might indicate a conversation that should be monitored for controversial material. While the DSS may maintain this information long-term for scanning, it is likely that a majority of the posts associated with controversial current events will appear shortly after these topics appear in the news. Furthermore, opinions are likely to moderate, and tempers less likely to flare as much, as time passes. Accordingly, for 'controversial current events' the scanning engine is preferably configured to have these variables (and rules) moved high up on the list in the short term, and lower down in the long term. Of course, users can configure which of these keywords they care about—so on the first warning, for example, about a potentially controversial posting about George Zimmerman, a user may click "IGNORE ALL" (rather than "IGNORE THIS POST") and the system will begin to IGNORE all posts he makes about that topic. Similarly to default configurations regarding standard DSS rule sets, the current event services may have default rules of their own. The potential problem of posts relating to current events similarly applies to businesses and other organizations, and also because the business may need to prevent certain content from appearing on social media during a specific period. For example, it may be fine for employees to discuss company X during ordinary times, but not during a potential acquisition of company X. Accordingly, the DSS may be configured by system administrators to reject, or delay, the posting of content relating to company X by employees.

In another embodiment, the DSS may assist social media providers to better secure their users by preventing them from making bad suggestions to their users. For example, people who are arrested possibly should not be suggested as Friends to people the next day. The same type of server that has info about current events could also contain an updated list of people not to suggest as friends or contacts—or could send this information down to the clients on smartphones and computers if such clients are used in that implementation of the invention. If the invention is running as a social media app it can interface with the server constantly. This, and similar, functionality, provided by the DSS could be offered by social media providers for individual users, for parents overseeing children, for businesses, organizations, and other entities overseeing employees, partners, and others. Likewise, DSS functionality could be adopted by Internet security software companies and anti-virus companies to enhance their social media scans which currently detect just malware and bad links.

Rule Sets

One aspect of the present invention involves "rules" that guide the security system at several stages of its operation. Multiple rules are sometimes referred to as "rule sets" in the drawings and accompanying text. In one embodiment, rules establish criteria for the setup and operation of the DSS. In another embodiment, rules set forth which online platforms should be scanned, and how. In another embodiment, rules may be viewed as variables and indicators to scan for when looking for potential issues. In another embodiment, rules provide how to address occurrences of issues and content containing those issues. Rules may be established by users of the DSS, overseers described above, or system administrators. The details of system configuration are described in greater detail below. However, in the preferred embodiment, the DSS comes pre-equipped with a default set of rules, or multiple sets, that may assist users in configuring what the system should scan for, and how to handle occurrences of relevant content.

In one embodiment, the DSS receives updates to rule sets from other computers and databases (for example, by receiving an updated list of names of people arrested for pedophilia—which may be scanned for if the user a warning if any of his 'Friends' on FACEBOOK™ have been arrested for such a crime and letting him decide whether to unfriend or not), or new rules that may be used to enhance scanning capabilities may be stored on a computer elsewhere as is common with modern-day apps and applications.

In order to safeguard users and organizations from potentially problematic information appearing online or on social media, in the preferred embodiment the DSS analyzes information from various sources, and where appropriate, draws conclusions from its analysis. The DSS is preferably capable of accessing various sources of information, including websites, FTP sites, databases, network repositories, messaging services, data sharing services, data transmission services, and any other electronically accessible resource capable of providing information. One of ordinary skill in the art would recognize that information available from various sources may exist in numerous data forms, including audio, video, images, text, database objects, database entries, data collections, computer readable data, and human readable data among others. In the preferred embodiment, the DSS is configured to analyze some or all of the various forms of data listed above, and determine whether the analyzed piece of information, together or in combination with other pieces of information, may cause a problem to an individual, organization, or object. Items of pertinent information that, in some embodiments, are analyzed by the DSS, may include information relating to human beings (such as their names, nicknames, visual appearance, weight, voice, age, location, sex, education level, title, patterns of behavior, preferences, medical history, life history, family relationships, residence, travels, and other data), or organizations (such as their names, abbreviations, associations, ownership, industry type, activities, products, services, management, age, governance, political activities, market presence, geographic presence, employees, and other data). These items of information are not provided as an exclusive list—rather, they are provided as an illustration of different types of data and information that the DSS may analyze while safeguarding users from potentially problematic or dangerous information being posted online or on social media. One of ordinary skill in the art will recognize that information of any sort, including images, video, audio, textual content, contextual data, geographic data, location, proximity, movement, chronological data, time, date, metadata, various data patterns, encrypted data, social media actions, user actions, user inaction, user selections, user omissions, patterns of user behavior, or the appearance of any of the above, may, in certain situations pose problems to an individual or organization if publicly disclosed. Further, in some embodiments, the DSS may be configured to detect connections and/or relationships between distinct types of information, further improving its ability to detect the existence of problematic information. Therefore, the DSS need not be limited to analyzing a single piece of information, or a collection of homogenous pieces of information, but can rather build a more comprehensive picture that reveals problems that cannot be detected by focusing on a single data point.

Below is a list of numerous situations for which the DSS may be configured to scan for, analyze and address. These situations include human and organizational actions, movement, content, posts, and other items of information and data (collectively referred to as variables or indicators) which, if became public, could cause problems to a user or organization. Appropriate rules for how to handle instances of a positive scan for these variables, or the discovery of an indicator, can be made by the user, administrator, overseer, or any other person with access to configuration parameters. Each item listed below can be used by itself or in combination with others. This list is not intended to be comprehensive or exhaustive, but to provide some examples of situations that can be addressed by the DSS, and rules that can be set up to guide the DSS in its functions. Other examples appear throughout this specification. Each occurrence of a variable or indicator listed below, may be addressed by the DSS pursuant to one or more rules, for example by deletion, quarantine, modification, ignoring, performing an action this time only, performing one action this time and a different action next time, addressing and notifying all parties involved, as well as taking other actions disclosed earlier. Unless stated otherwise, 'address' in the following examples refers to taking action in response to a positive identification of a variable or indicator being scanned for (i.e. finding content that triggers a response) based on certain pre-configured rules.

Any references to numbers that are in the form of a social security number, credit card number, etc. Scan for relevant information, analyze, and address.

If a user notes that he was at a particular financial institution, that information might assist someone attempting financial fraud against the user. Scan for relevant information, analyze, and address.

If a person posts photos of children that are geotagged, that information might assist a kidnapper. This includes any postings that don not have technical geotagging but which contain information about where the kids go to school, afterschool activities, etc. Scan for relevant information, analyze, and address.

If a user's privacy settings allow anyone to see their media that might increase all sorts of risks. Scan for relevant information, analyze, and address.

If a user is posting family related material and allows non-family parties to see that might lead to issues. Scan for relevant information, analyze, and address.

If a person mentions schools, camps, day care, or other youth programs that his/her children, or other children with whom he or she is associated, attend, that information may increase the risk of a kidnapper or pedophile targeting these children, or allowing other criminals to ascertain his or her schedule and rob his or her house or office. Scan for relevant information, analyze, and address.

The name of schools that someone attended are sometimes used for bank logins. Scan for relevant information, analyze, and address. In this case and in all others addressing may mean to limit visibility to some users and not others. The rule may apply to different people, groups, or entities differently. Further, where appropriate assign multiple levels of risk and address the different levels accordingly.

Type, make, model, and color of someone's first car is often used by financial institutions as part of a login process. Scan for relevant information, analyze, and address.

The name of one's best man or maid of honor, pet, first pet, mother or father's middle name, mother's maiden name, grandparents' names, parents' birthdays are sometimes used by banks as passwords. Scan for relevant information, analyze, and address.

Similarly, "questions" are sometimes used for authentication and login purposes, but the answer can often be found in social media that a person or entity has shared. Scan for relevant information, analyze, and address. In one embodiment, the DSS secures by addressing any item that is used as part of authentication questions (i.e., challenge questions) that can be discerned from social media directly or indirectly by either modifying it, removing it, quarantining it, limiting its exposure to parties that pose no risk or already have the information, or allowing the user to do with it what he wants after making him cognizant of the risks inherent is sharing this information. Other examples of this would first girlfriends name, name of your college, place of first kiss, mascot of high school or college, etc.

If a person mentions schools, camps, day care, or other youth programs that his/her children—or other children with whom he/she is associated—with information that may indicate the time that the child arrives at or leaves the facility attend that may increase the risk of a kidnapper or pedophile targeting these children, as well as may help criminals break into the user's home. Scan for relevant information, analyze, and address.

If a person mentions schools, camps, day care, or other youth programs that his/her children—or other children with whom he/she is associated—with information that may indicate the time that the child arrives at or leaves the facility as well as the time that the parent is away, this may increase the risk of a kidnapper or pedophile targeting these children, or may make a potential burglar aware of a time window during which the user's home or someone else's home may be empty thereby making it a good burglary target. Scan for relevant information, analyze, and address.

If a person indicates anything about a child's school or camp trip that may increase risks to the child. Scan for relevant information, analyze, and address.

If a person posts pictures of teenagers engaged in activities that are inappropriate (or even illegal for people under a certain age). Scan for relevant information, analyze, and address.

If the user notes that he is in some particular location for example by "checking in" by geotagging it, by mentioning it, or by photographing it, and that location is far from home that might indicate that the user's home is empty which could be a sign for criminals to break in. Scan for relevant information, analyze, and address.

If in the aforementioned example, the user mentions their family being away, or has a family photo at such a location, or the location is normally associated with family vacations (e.g., Disneyland), the risk may be greater. Scan for relevant information, analyze, and address.

If the user notes that they will be attending an upcoming event that may provide an opportunity for user for a criminal to attempt to break into their home when the user is away. Scan for relevant information, analyze, and address.

If the user posts information about his or her schedule or someone else does that may provide criminals with information that may help with break ins, social engineering, etc. Scan for relevant information, analyze, and address.

If a user posts information about passwords, account numbers, or other confidential information. Scan for relevant information, analyze, and address.

If the user was injured and is making a claim, such as workers' compensation, disability, or lawsuit, and posts material that could be used—or misused—to dispute the validity of that claim. Scan for relevant information, analyze, and address.

If a user mentions that he she has broken the law, including motor vehicle offenses. Scan for relevant information, analyze, and address.

If a user is pictured or mentioned with alcohol or cigarettes or some other sort of activity that may be legal but not viewed in the highest regard. Scan for relevant information, analyze, and address.

If a number appears that seems to be a social security number or its last four digits (e.g., XXX-XX-XXXX or is four or nine digits and appears in close proximity to the words "social security"), or a credit card number (four sets of four digits, sixteen digits—or in the case of American Express 15 or XXXX-XXXXXX-XXXXX). Scan for relevant information, analyze, and address.

If inappropriate language or tone is detected. This may also include words that the invention determines are inappropriate within certain contexts via natural language processing. For example, calling a donkey a donkey or ass might be fine, but calling a person the same is probably not. Scan for relevant information, analyze, and address.

If people are in some state of undress that may be controversial. This can be detected not only from photos (via skin tone detection) and photo captions, but from keywords as well. Scan for relevant information, analyze, and address.

If names of people the user does not want to think about or associate with—address. Scan for relevant information, analyze, and address.

If the user is under the minimum age for smoking or drinking and such words appear in a description, or a photo is analyzed and shows such activity. Scan for relevant information, analyze, and address.

Photographs or text mentioning potentially controversial items could create issues for a user—what may be controversial in some contexts may not apply to others (e.g., guns, drugs, alcohol, religious practices, sexual practices). Scan for relevant information, analyze, and address.

People may not want to be associated with criminals or people in the news for various nefarious activities. Scanning a user's friends list and comparing to names in the news (either via a news search site, a news site, or via a special current events server as part of the invented system), criminal lists, etc. may be useful. Scan for relevant information, analyze, and address.

Users privacy settings should also be verified to ensure the information is only displayed to people that the user intends to. Scan for relevant information, analyze, and address.

If user is undergoing a divorce—anything that may impact should be checked for—comments about other women, pictures with other women, comments about his soon to be ex-wife, etc. Scan for relevant information, analyze, and address.

If a user is applying for job, or has a job with a firm—mentions of that firm or competitors could be problematic. Scan for relevant information, analyze, and address.

Comments about one's co-workers or boss (or former co-workers and formers bosses) can also become issues. Scan for relevant information, analyze, and address.

Negative posts about a person, organization, etc. could be problematic as they could become grounds for a defamation or libel lawsuit. Scan for relevant information, analyze, and address.

Anything about any form of medical condition or presence in the hospital or at a particular doctor could disclose medical information about the user or a close relative or friend. Scan for relevant information, analyze, and address.

Scanning the user's friends—if there is a disproportionate number of people with the same last name (meaning whatever last names occur the most among the users' friends, followers, etc.) or some sort of identical name that may indicate that this is the user's mother's maiden name which may be used as a password elsewhere. Scan for relevant information, analyze, and address.

If the user's location is changing rapidly and his GPS location shows he is on a road—he or she may be driving. Scan for relevant information, analyze, and address.

In many cases it is best that only relatives be able to see the relationship between people from a familial perspective because various questions about familial relationships may be used for passwords. Check if this is not the case with the user's settings in his social media account/s. Scan for relevant information, analyze, and address.

Compliance risks—in certain industries a person's communication may be regulated. For example, a stockbroker's postings about stocks might be regulated. If the user has configured his profession the invention can optimize such scanning, but, even without it can scan for keywords and phrases as well as use natural language analysis to prevent problems. Scan for relevant information, analyze, and address.

Scanning for stock or financial related advice, medical advice, or legal advice, and perhaps other forms of advice and suggestions may be indicative of user actions or intentions. Detection may prevent potential civil or criminal issues if people follow such advice. Scan for relevant information, analyze, and address.

Comments that are vulgar, facetious, etc. Scan for relevant information, analyze, and address.

Photographs of the user in certain environments (e.g., certain clubs and venues) could be problematic. Scan for relevant information, analyze, and address.

Religious observances and other sensitive activity may also be flagged. Scan for relevant information, analyze, and address.

Posts that contain certain terms and/or phrases—for example those related to terrorist groups, extremist groups, certain political groups, certain types of munitions, may lead to an increased likelihood of government snooping, monitoring, or other invasions of privacy. This is especially true in the aftermath of terrorist attacks and other events that incentivize governments to perform surveillance. Scan for relevant information, analyze, and address.

Photographs, comments, videos, or postings that indicate that the user is a member of a particular organization to which the user may or may not wish everyone to know that he is a member. Scan for relevant information, analyze, and address.

If the user is a party to a lawsuit a warning should be made in general, and anything related to the suit is potentially problematic. When the system initially starts up it can ask the user if he is party to any lawsuits, what his profession is, etc. He does not have to answer—but providing the DSS with such information can help it help the user. Scan for relevant information, analyze, and address.

Profanities (in any language) should be flagged. Scan for relevant information, analyze, and address.

Same with other forms vulgarities. Scan for relevant information, analyze, and address.

If an image, video, string of text, link, etc. is copyrighted (explicitly or implicitly). Scan for relevant information, analyze, and address.

If an item is copyrighted by specific parties that the user configures. For example, an image copyrighted by a business competitor may be a problem for the user even if all other copyright owners are not an issue. Scan for relevant information, analyze, and address.

If a user attempts to send out an invitation to a future event that may put those who respond at risk based on their responses (Yes=They are not home, No because I am away my house may be empty, etc.). Scan for relevant information, analyze, and address.

Personal messages that should be sent as personal messages not as public comments or posts are sometimes accidentally sent as such. One way to find many of them is to scan for comments/tweets/public messages sent to a user's parents, children, spouse, or siblings. Scan for relevant information, analyze, and address.

Language that may be used in a facetious way. Literal words can be understood as a threat. Scan for relevant information, analyze, and address.

Since information that is liked, sports teams that are mentioned, celebrities that are mentioned, other interests that are mentioned, etc. can be used in social engineering, it is useful to keep this information private. Scan for relevant information, analyze, and address.

Revealing the name of your employer can cause unscrupulous parties to try to extrapolate information about the employer's business, as well as facilitate social-engineering attacks against the business and identity theft. Scan for relevant information, analyze, and address.

Revealing one's email address or phone or cellphone number online in a venue that also provides information about the user can lead to a whole host of problems. Scan for relevant information, analyze, and address.

If the user is not using an Internet security package—as is often the case on mobile devices used to access social media—it would be wise to warn about any links, downloads, etc. Scan for relevant information, analyze, and address.

Posting family related matters to business colleagues or viewable to business colleagues may present issues. Scan for relevant information, analyze, and address.

Younger people posting when they are out sick—or kids posting during the school day—may get them into trouble. Scan for relevant information, analyze, and address.

People taking a sick day who comment about this online can get themselves into trouble from their bosses at work—address. The same goes for many extensions of this concept. Scan for relevant information, analyze, and address.

Using words that may indicate problems not mentioned—e.g., mentioning a "hangover" in the morning may not be advisable for various reasons. Scan for relevant information, analyze, and address.

Anything that may indicate a deviation from the user's sexual orientation as known to the public should be addressed. This would include a heterosexual being seen at an event or venue known to cater to homosexual dating, or vice versa. The same would be true for any other type of controversial relationship that deviates from a user's public persona. Scan for relevant information, analyze, and address.

Items posted from locations far away from home may be objectionable if the user is still away, but if he is home, or has posted from home in between the time they were created and posted they may be fine. For example, a photo taken in Hawaii when the user lives in New York City may be problematic to post while the user still is in Hawaii, but if he has already returned to New York City and posted since then the system should realize this and act accordingly. This can be determined either by asking the user or by checking the date in a photo or video versus the date it is being posted and seeing if posts made locally to the person's home were made in between. Scan for relevant information, analyze, and address.

If the user lists a home location in his profile, or a work location, or both, but many of his posts on social media seem to come from elsewhere this may indicate incorrect information or a frequently traveling user which could expose him to risk as described earlier. Scan for relevant information, analyze, and address.

Posting one's home or office location can lead to stalking—especially if this information is public. In some cases a user may have no problems publishing it, in others he might. Scan for relevant information, analyze, and address.

The same goes for gym locations or locations of other venues a user frequents. Scan for relevant information, analyze, and address.

If a user adds multiple parties from the M & A division of a firm, or of a competing or tangential firm, it might indicate that M & A activity is being considered. Scan for relevant information, analyze, and address.

If a user adds multiple parties from a firm X as contacts that might indicate that he or his employer is contemplating, considering, pursuing, or actively working on a project with firm X. The same goes for organizations. Scan for relevant information, analyze, and address.

If a user is under a certain age and a contact with a much older age is added who is not listed a relative that may be of concern. Scan for relevant information, analyze, and address.

If a user adds a contact who is new on the social media platform, there is a possibility that it is from a fake account. Scan for relevant information, analyze, and address.

If a child adds a friend a person with whom the parents do not want the child associating, this may be problematic. Scan for relevant information, analyze, and address.

An organization/business producing rules for employees, a parent, or a regular user may establish custom terms for which scanning should occur. This may include positive match terms (if found there may be an issue so notify) or negative match (even though such terms match another rule ignore the match and do not notify). For a business, for example, positive match terms may include keywords, acronyms, competitor info, key personnel names, tickers, names of firms with which businesses is being conducted, M & A targets, potential acquirers, partners, product names, contemplated product names, locations related to the business, conferences related to the business, meetings related to the business, names of potential hires, government terms related to the business or potential challenges to the business such as the name of an auditor, internal names of systems, procedures, and teams, payroll info, and employee info and names. An example of a negative term—one that should be ignored even though it matches on other rules—might be various medical terms if the user is a doctor—the terms might be sensitive for a patient to disclose, but a doctor writing an article about treating the condition wants publicity, not privacy. An instantiation of the invention in the case of a parent would be the parent putting the name of someone with whom he does not wish his child to associate as a positive term.

Rewards

One aspect of the present invention is to provide rewards to users of the disclosed security system, thereby increasing use and enhancing security. The user may be rewarded for using the system and making edits, for time elapsed since he started using it, based on the number of modifications made, or any other criteria that an implementer of the DSS so desires. The user will also have the opportunity to compete with his or her contacts vis-à-vis how many rewards points he or she earns. At the end of some period of time for example, the DSS may issue bonus points for those who have earned the most, and "groups" may be awarded bonus points for hitting certain targets. This can motivate people to get their contacts (e.g., FACEBOOK™ friends) to use the security software. Likewise, businesses can motivate their employees to use the system not only by explaining that by doing so they will protect themselves, but also through rewards. The disclosed system may also offer a general option to cash out points in exchange for rewards—either cash, miles, points in other point systems, or specific offers from third-parties.

Furthermore, implementations of the invention may allow users to socialize their rewards—that is discuss the reward program, share their current reward info, preferences and point tallies with parties whom they deem appropriate to see such information. Control of this information can be achieved via the same types of rules that are discussed throughout this specification. Also, as an implementation of the invention a business can create an incentive program for employees to use the security technology—either via recognition or providing rewards for those who use it above a certain threshold, the most, or some other benchmark for reward.

Configuration

As noted previously, one aspect of the invention is the robust configurability provided for all stages of the security system. Various components or modules of the DSS may be configured by the user, overseer, administrator, or any other party granted access to configure the system. To illustrate the flexibility of the DSS and its configurability, the following examples are provided:

settings may be configured before usage. For example, as one entry in the configuration, the user may specify that any time a certain location is noted within his social media as the location of a photo, a check-in, a posting, or other content, the location should be removed.

no settings are configured before usage, but as various potential issues are detected by the system the user is prompted to provide guidelines on how to handle those particular issues and whether to apply the rule that detected them in the future, and if so, how strictly. Furthermore, the desired response to such a rule may be configured at that point. For example, should the system automatically delete a post that it detects as violating a rule, should it warn the user about it but not yet delete it, should it delete it and notify the user, should it delay posting to social media for a while (temporary quarantine), should it quarantine it—that is delete it from the social media but ask the user whether to delete it or restore it, should it suggest edits to content or settings (e.g., the user may be OK with leaving a picture of something is it is seen by only a specific group of users, but not by others—so suggest that he set this to viewable by only a group as a possibility), and other possibilities. In some embodiments, the user may be asked how he or she should be notified of potentially problematic content—for example, by text message, email, social-media message (e.g., TWITTER™ Tweet, FACEBOOK™ message, or other platform), or other communication means. In some embodiments the system may only notify users, but not offer the ability to remove or quarantine the offending material.

some settings are configured before usage, and some settings are configured during usage.

one or more rule sets, which may be standard or default sets, are selected by a user, and then edited before usage, during usage, or in some combination.

a configuration is received by a user from another user, or from a backup of his own configuration. The user may instruct the system to use the received configuration.

businesses or organizations may set up an overall management "account" and within the account create one or more settings, including rule sets for scanning, contacts control, and other conditions that are applied to users who authorize the business or organization settings to apply to their social media profiles.

As one of ordinary skill in the art would recognize, other configuration options exist as well.

Configuring the system may be accomplished in a variety of ways, including uploading a configuration file to a DSS server, accessing a web-based configuration interface by entering an IP address or a pre-configured host name into a browser, following text based prompts on a terminal screen, or interacting with the DSS via text messages, social media, or e-mail, among other options.

Figure 21:
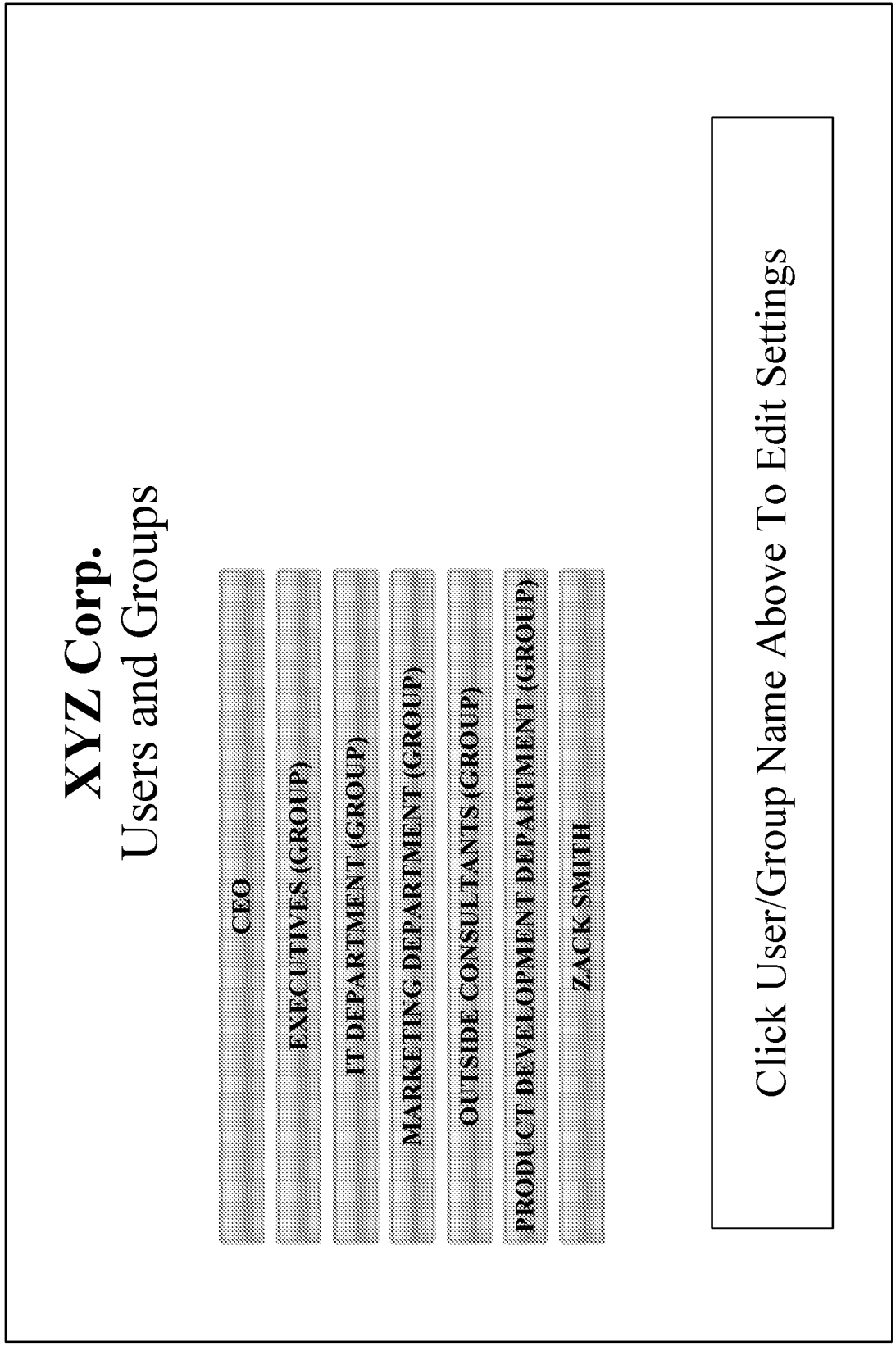
FIG. 21 illustrates a configuration screen for one embodiment of the invention.

One embodiment of a web-based configuration interface is illustrated in FIG. 21. After logging into system, whether by entering a login/password combination, or through other authorization and/or authentication means, such as by uploading a cryptographic key or encrypted file, the user or administrator is presented with a "Users and Groups" screen. The screen lists all individuals and groups that have been pre-configured by XYZ Corp.'s IT department, including the CEO and Zack Smith, who are individuals, and Groups for Executives, IT Department, Marketing Department, Outside Consultants, and Product Development Department. In order to configure settings and rules for any of the listed users or groups, the administrator need only select or click on the desired user or group name, and then set up corresponding rules and settings. The administrator may also select multiple groups or users from the list, to change settings in bulk.

Figure 22:
FIG. 22 illustrates a second configuration screen for one embodiment of the invention.
Figure 22:
Figure 22:
Figure 22:

FIG. 22 illustrates one embodiment of a web-based screen used to configure rules for a group. In FIG. 22, the user has already clicked on the Marketing Department link in the previous screen, illustrated in FIG. 21. In this embodiment, the Rules screen for the Marketing Department lists various platform names, and various rules underneath each platform name. In this example, a Platform may be a social media platform like FACEBOOK™ or TWITTER™. Various rules, described in detail above, are available for each platform, and may from platform to platform depending on the specifics of how each platform functions. In the illustrated example, the administrator has selected check boxes for both Platform Name A and Platform Name B. However, the administrator chose to select only the first rule appearing under Platform Name A, and only the second rule appearing under Platform Name B. Once the administrator saves the settings (or they are saved automatically based on a timer or clicking action), the DSS will update its runtime configuration and begin implementing the rules selected by the administrator in FIG. 22.

In another embodiment, the web-based configuration utility provides a graphical user interface with a matrix containing a selection list of variables or rules in one column and a list of possible actions in a second. It may also include a third column that specifies groups or users. For example, in a rule that checks content for the presence of a geographic location, such as a photograph of the user that has been geotagged, a user may further refine the rule by allowing the sharing of content by a "group of close relatives" and request warnings if the content is shared by all other groups.

Each element of configuration, including rules and other variables, can be used by itself or in combination with others. For example, configuring which variables to look for and which rules to apply, what actions should be taken when a rule applies, which partners a user wants to be rewarded with or whether they want to earn general points for using security with proper secure behavior, may all be combined to create rule sets. All of this can be configured either on initial use, or as rules are triggered, or via a configuration option within the app or interface of the DSS as it runs.

In another aspect of the invention, a template may be provided to a business or organization indicating the types of items that should be scanned for in social media. An example of this might include: product and product line names and terms, service and service line names and terms, marketing terms, internal keywords, employee names, locations, competitor names and product/service related terms, M & A related keywords and names, terms related to strategy, ticker symbols, internal acronyms, internal keywords, project names, intellectual property terms, people the firm is looking to hire, as well as other sensitive items. For household use, a template may indicate to a parent types of items that he or she should ensure his or her child is protected from on social media.

When the system starts up the first time it may ask the user some questions depending on the implementation—e.g., what is your profession—in order to optimize compliance type scanning. If this information is already in his profile (from FACEBOOK™, LINKEDIN™, INSTAGRAM™, PINTEREST™, TWITTER™, or other social media profiles) then the system will obtain the information from the existing profile.

In another aspect of the invention, the DSS also includes capability for a business or other entity to create an account that will establish rules for social media that the DSS will use to detect issues, and to have users agree to accept those rules, or to authorize the rule set managed by the entity to be integrated with the users' scan profiles. By employing this mechanism, the DSS allows a business to establish rules for social media scanning that employees can accept so that the employees will be notified if they—or someone else tagging them—violates such rules. Some implementations of the invention may pass an entire rule set from an employer to an employee upon authorization, while others may pass a subset of rules while the employee controls the others. If an employee deauthorizes the employer and its rule set, the employer would preferably be notified of such action by the DSS.

In one embodiment, an employer, for example, might establish an account for which it can set up a set of rules, or perhaps multiple sets of rules each of which will be intended for a different group of users. The employer may then ask employees to authorize the app (in an app based implementation for the invention) and may examine periodic reports to see who has authorized it and who has not. The organization would also have an interface to manage rule sets, groups, users, any notifications it receives (such as those concerning employees who do not act on warnings from the system if those warnings are then to be sent to the employer as discussed above). Similar provisions can be made for parents and guardians.

To maximize use of the DSS, businesses may explain to their employees that an implementation of the invention will help them safe from violating employer policy, and offer it for use. To educate employees and other individuals on best security practices, and how to maximize benefits from the disclosed security system, businesses and organizations may offer training and classes in those topics. The training and classes may be offer via the Web or other presentation method by the disclosed system.

What is claimed is:

1. A computer-implemented method, comprising:
presenting to a user a configuration interface containing one or more input fields;
receiving information input by the user into the one or more input fields in the configuration interface, wherein the information input comprises filtering criteria;
transmitting the information inputted by the user to a server on a network;
generating, by the server, one or more rules for social media data being posted by an additional user on a social media platform based at least on the information input by the user;
receiving a request to present the social media data on the social media platform;
in response to the request, determining, by the server, whether one or more actions are triggered based at least on the one or more rules, wherein the determining comprises performing an expression match between at least a portion of the social media data and the filtering criteria; and
upon determining that the one or more actions are triggered, performing the one or more actions.

2. The computer-implemented method of claim 1, wherein the filtering criteria comprises an identification associated with the additional user.

3. The computer-implemented method of claim 1, wherein the one or more rules are further based at least on reports associated with similar social media data from the additional user.

4. The computer-implemented method of claim 1, wherein the one or more actions comprise rejecting the request to post the social media data on the social media platform.

5. The computer-implemented method of claim 4, wherein the social media data comprises offending materials.

6. The computer-implemented method of claim 1, wherein the at least the portion of the social media data comprises text associated with the one or more actions.

7. The computer-implemented method of claim 1, wherein the at least the portion of the social media data comprises a visual element associated with the one or more actions.

8. A system, comprising:
one or more non-transitory storage medium configured to provide stored computer-readable instructions, the one or more non-transitory storage mediums coupled to one or more processors, the one or more processors configured to executed the computer-readable instructions to cause the one or more processors to:
receive, at a social media server, a request to publish information on a social media site;
identify one or more pre-configured rules associated with the information;
analyze the request pursuant to the one or more pre-configured rules; and
perform an action with respect to the request to publish the information in accordance with the one or more pre-configured rules, wherein the social media server is configured to receive the request originating from computing devices in communication with private or public networks, and further wherein the social media server is not an outbound traffic proxy server configured to act as a security appliance at the edge of a corporate network.

9. The system of claim 8, wherein the action comprises at least partially obscuring the information on the social media site.

10. The system of claim 8, wherein the action comprises presenting a warning to users of the social media site regarding the information published.

11. The system of claim 10, wherein the one or more processors are configured to:
   receive an additional request to dismiss the warning; and
   in response to receiving the additional request, presenting the information on the social media site.

12. The system of claim 10, wherein the warning is associated with an accuracy of the information.

13. The system of claim 8, wherein the one or more pre-configured rules are associated with an identity of a requesting entity.

14. The system of claim 8, wherein the one or more pre-configured rules are associated with intended audience of the information.

15. One or more non-transitory computer-readable media storing computer-executable instructions that upon execution cause one or more processors to perform acts comprising:
   presenting to a user a configuration interface containing one or more input fields;
   receiving information input by the user into the one or more input fields in the configuration interface, wherein the information input comprises configuration information and filtering criteria;
   transmitting the information input by the user to a server in a network;
   generating, by the server, one or more rules for social media data being posted by an additional user on a social media platform based at least on the information input by the user;
   receiving a request to present the social media data on the social media platform;
   in response to the request, determining, by the server, whether one or more actions are triggered based at least on the one or more rules and the configuration information, wherein the determining comprises performing an expression match between at least a portion of the social media data and the filtering criteria; and
   upon determining that the one or more actions are triggered, performing the one or more actions.

16. The one or more non-transitory computer-readable media of claim 15, wherein the filtering criteria comprises at least one of an identification associated with the additional user and intended audience of the social media data.

17. The one or more non-transitory computer-readable media of claim 15, wherein the one or more rules are further based at least on reports indicating inaccuracy of the social media data from the additional user.

18. The one or more non-transitory computer-readable media of claim 15, wherein the one or more actions comprise at least partially obscuring the information on the social media site.

19. The one or more non-transitory computer-readable media of claim 18, wherein the one or more rules are further based at least on reports indicating presence of offending materials in the social media data from the additional user.

20. The one or more non-transitory computer-readable media of claim 15, wherein the at least the portion of the social media data comprises at least one of a text and an image associated with the one or more actions.

* * * * *